US 9,254,861 B2

(12) United States Patent
Iwakawa et al.

(10) Patent No.: US 9,254,861 B2
(45) Date of Patent: Feb. 9, 2016

(54) ELECTRIC STEERING WHEEL POSITION ADJUSTMENT APPARATUS

(71) Applicant: NSK Ltd., Shinagawa-ku, Tokyo (JP)

(72) Inventors: Masato Iwakawa, Maebashi (JP); Yoshiyuki Sekii, Maebashi (JP); Hiroshi Kakita, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/403,501

(22) PCT Filed: May 22, 2013

(86) PCT No.: PCT/JP2013/064284
§ 371 (c)(1),
(2) Date: Nov. 24, 2014

(87) PCT Pub. No.: WO2013/176193
PCT Pub. Date: Nov. 28, 2013

(65) Prior Publication Data
US 2015/0090067 A1    Apr. 2, 2015

(30) Foreign Application Priority Data

May 25, 2012  (JP) ................................. 2012-119918
May 28, 2012  (JP) ................................. 2012-120384
Jun. 26, 2012  (JP) ................................. 2012-143029

(51) Int. Cl.
*B62D 1/189*    (2006.01)
*B62D 1/181*    (2006.01)
(Continued)

(52) U.S. Cl.
CPC ............... *B62D 1/189* (2013.01); *B62D 1/181* (2013.01); *B62D 1/185* (2013.01); *B62D 1/187* (2013.01)

(58) Field of Classification Search
CPC .......... B62D 1/187; B62D 1/185; B62D 1/181
USPC ............................................ 280/775; 74/493
See application file for complete search history.

(56) References Cited

U.S. PATENT DOCUMENTS 4,900,059 A  *  2/1990  Kinoshita et al. ............. 280/775
6,079,743 A        6/2000  Grams
(Continued)

FOREIGN PATENT DOCUMENTS

DE      102 51 764 A1    5/2004
EP       1 980 470 A1   10/2008
(Continued)

OTHER PUBLICATIONS

Kitano, Akira. JP 2009-248899 Telescopic Type Steering Device Oct. 2009, Machine English Translation.*
(Continued)

*Primary Examiner* — Karen Beck
(74) *Attorney, Agent, or Firm* — Crowell & Moring LLP

(57) ABSTRACT

The electric steering wheel position adjustment apparatus of the present invention is constructed so as to improve the support rigidity of a portion that constitutes a steering column apparatus thereof, such that the steering shaft 2b and the steering column 5b have non-expandable construction, but are able to be displaced in the axial direction; holding holes are provided in at least two locations on the top side of the column holder 31 that supports the steering column 5b; and in each of the holding holes, a sliding plate 35, an elastic member 37 and a cover 38 are assembled such that the sliding plate 35 is elastically compressed by the elastic member 37 and pushes the outer circumferential surface of the steering column 5b.

7 Claims, 24 Drawing Sheets

(51) Int. Cl.
  *B62D 1/187* (2006.01)
  *B62D 1/185* (2006.01)

(56) References Cited

U.S. PATENT DOCUMENTS

| | | | |
|---|---|---|---|
| 8,991,861 B1 * | 3/2015 | Iwakawa et al. | ............. 280/775 |
| 2007/0126222 A1 * | 6/2007 | Koya et al. | ................... 280/775 |
| 2008/0216597 A1 * | 9/2008 | Iwakawa et al. | ................ 74/493 |
| 2009/0000417 A1 | 1/2009 | Oshita et al. | |
| 2011/0215560 A1 | 9/2011 | Born et al. | |
| 2015/0069745 A1 * | 3/2015 | Iwakawa et al. | ............. 280/775 |

FOREIGN PATENT DOCUMENTS

| | | | |
|---|---|---|---|
| JP | 61-5263 U | 1/1986 | |
| JP | 9-323658 A | 12/1997 | |
| JP | 10-119793 A | 5/1998 | |
| JP | 2005-255040 A | 9/2005 | |
| JP | 2006-297989 A | 11/2006 | |
| JP | 2009-6743 A | 1/2009 | |
| JP | 2009-248899 A | 10/2009 | |
| JP | 2010-83392 A | 4/2010 | |
| JP | 2010-116042 A | 5/2010 | |
| JP | 5076908 B2 | 11/2012 | |

OTHER PUBLICATIONS

International Search Report dated Aug. 6, 2013 with English translation (five (5) pages).

International Preliminary Report on Patentability (PCT/IPEA/409) dated Jun. 10, 2014, including English translation (six (6) pages).

* cited by examiner

ELECTRIC STEERING WHEEL POSITION ADJUSTMENT APPARATUS

TECHNICAL FIELD

The present invention relates to an electric steering wheel position adjustment apparatus, and more specifically to an apparatus that has an electric motor as a drive source and that adjusts the forward-backward position and up-down position of a steering wheel.

BACKGROUND ART

Electric steering wheel position adjustment apparatuses having various kinds of construction are known, and some are already being used as the steering apparatuses of automobiles. FIG. 21 illustrates a first example of conventional construction that was disclosed in JP 2010-116042 (A). The steering shaft 2 to which the steering wheel 1 is fastened has a cylindrical outer shaft, and a circular rod shaped inner shaft 4 that is inserted inside the outer shaft 3 so as to be able to move back-and-forth in the axial direction, and so as to be able to transmit torque. More specifically, there is a spline fit between the middle section to the front-end section of the inner circumferential surface of the outer shaft 3 and the outer circumferential surface of the rear-end section of the inner shaft 4. The steering wheel 1 is fastened to the rear-end section of the outer shaft 3.

The steering shaft 2 is inserted inside a cylindrical shaped steering column 5, and is supported so as to be able to freely rotate. The steering column 5 has a cylindrical outer column 6 that is supported by the vehicle body, and a cylindrical inner column 7 that is inserted inside the outer column 6 so as to be able to move back-and-forth in the axial direction. The portion near the rear end of the middle section of the outer shaft 3 is supported on the radially inside of the rear-end section of the inner column 7 so as to be prevented from displacing in the axial direction, and so as to be able to rotate freely. Moreover, the portion near the front end of the middle section of the inner shaft 4 is supported on the radially inside of the front-end section of the outer column 6 so as to be prevented from displacement in the axial direction, and so as to be able to rotate freely. With this construction, the steering shaft 2 is supported on the inside of the steering column 5 so as to be able to rotate freely, and the outer shaft 3 and inner column 7 are capable of relative movement in the forward-backward direction with respect to the inner shaft 4 and outer column 6.

The apparatus of the first example of conventional construction, as an electric actuator in order to be able to adjust the forward-backward position of the steering wheel 1, has: a gear housing 8 that is fastened to the bottom surface of the outer column 6; a feed nut 9 that is supported on the inside of the gear housing 8 so as to be prevented from displacement in the axial direction, and so as to be able to only rotate; a push-pull arm 10 that is fastened to a portion of the rear-end section of the inner column 7 that protrudes further toward the rear than the outer column 6; a push-pull rod 11 having a male screw section 12 provided on the front half thereof that screws into the feed nut 9, and the rear-end section thereof being linked with the push-pull arm 10; and an electric motor (omitted in the figure) that is connected to the feed nut 9 by way of a worm reducer 13, and that rotates and drives the feed nut 9.

When adjusting the forward-backward position of the steering wheel 1, the feed nut 9 is rotated, which causes the push-pull rod 11 to be displaced in the axial direction. Due to this displacement, the inner column 7, by way of the push-pull arm 10, is displaced in the same direction as the push-pull rod 11, and by causing the outer shaft 3 that is supported on the inside of the inner column 7 to move in the forward-backward direction together with the inner column, the forward-backward position of the steering wheel 1 is adjusted.

In the electric steering wheel position adjustment apparatus of this first example of conventional construction, there is a possibility that the driver that operates the steering wheel 1 will experience an unpleasant or uncomfortable feeling due to a small space that exist in the area of fit between the rear-end section of the outer column 6 and the front-end section of the inner column 7. In other words, in the electric steering wheel position adjustment apparatus, differing from a manual apparatus, even in the state in which the adjusted position of the steering wheel 1 is maintained, the diameter of the rear-end section of the outer column 6 is not reduced, and a small space remains in the area of fit. Due to this small space, there is a possibility that the inner column 7 that supports the outer shaft 3 to which the steering wheel 1 is fastened will be loose with respect to the outer column 6 that is supported by the vehicle body. Due to this loose fit, the feeling of support rigidity of the steering wheel 1 will decrease, and there is a possibility that the driver that operates the steering wheel 1 will experience an unpleasant feeling. Moreover, this looseness causes the resonant frequency of the members of the electric steering wheel position adjustment apparatus that constitutes the steering column apparatus that includes the steering shaft 2 and steering column 5 to decrease, and when there is small vibration of the vehicle body when traveling over a bad road or the like, there is a possibility that unpleasant noise or vibration will occur in this steering column apparatus.

FIG. 22 and FIG. 23 illustrate a second example of conventional construction that is disclosed in JP 2006-297989 (A). In this second example of conventional construction as well, as in the first example of conventional construction, the steering shaft 2a is supported on the inside of the steering column 5a so as to be able to rotate freely, and the outer shaft 3a and inner column 7a are able move in the forward-backward direction relative to the inner shaft 4a and outer column 6a.

In this second example of conventional construction, by using a linear motion ultrasonic motor 15 that is supported by the bottom-end section of an installation bracket 14 as an actuator in order to be able to adjust the forward-backward position of the steering wheel 1, it is possible for the inner column 7a to be displaced in the axial direction with respect to the outer column 6a. More specifically, a moving piece 16 of the linear motion ultrasonic motor 15 and inner column 7a are linked by a transmission member 17, and by transmitting the movement of the moving piece 16 to the inner column 7a, it is possible to move the inner column 7a in the forward-backward direction. The base-end section of the transmission member 17 is fastened by screws to the inner column 7a, and the tip-end section of the transmission member 17 is linked to the moving piece 16 by way of a spherical joint 18. The spherical joint 18 has: an engaging concave section 19 that is formed in the moving piece 16; a spacer 20 that fits with and is supported by the engaging concave section 19, and that has an inner circumferential surface that is a spherical concave surface; and a spherical surface engaging section 21 that engages with the inner circumferential surface of the spacer 20.

When adjusting the forward-backward position of the steering wheel 1, the linear motion ultrasonic motor 15 causes the moving piece 16 to be displaced in the axial direction of the steering column 5a. This displacement, by way of the transmission member 17, causes the inner column 7a to be displaced in the same direction as the moving piece 16, which causes the outer shaft 3a that is supported on the inside of the inner column 7a to move in the forward-backward direction together with the inner column 7a. As a result, as illustrated by the two-dot chain line in FIG. 22, it becomes possible to adjust the forward-backward position of the steering wheel 1.

In the case of the construction of this second example of conventional technology, there is a problem in that due to the construction of the engagement area between the moving piece 16 and the transmission member 17, the manufacturing cost for maintaining smooth operation increases. In other words, in order to smoothly perform adjustment of the forward-backward position of the steering wheel 1 without any looseness, it is necessary to properly regulate the fitting strength at the engagement area between the spherical engaging section 21 of the transmission member 17 and the spacer 20. When the fitting strength is to low, a positive gap occurs in this engagement area, and looseness occurs between the spherical engaging section 21 and the spacer 20, which easily causes rattling of the steering wheel 1 in the forward-backward direction. On the other hand, when the fitting strength is too high, pivotal displacement of the spacer 20 with respect to the spherical engaging section 21 cannot be performed smoothly.

In the construction of this second example of conventional technology, the amount of movement in the forward-backward direction of the moving piece 16 is large, and unless there is a good degree of parallel accuracy between the movement direction of this moving piece 16 and the movement direction of the inner column 7a when performing forward-backward position adjustment of the steering wheel 1, as the forward-backward position of the steering wheel 1 is adjusted, the transmission member 17 will be displaced in the axial direction of the transmission member relative to the moving piece 16. This relative displacement causes rubbing in the axial direction of the transmission member 17 between the outer circumferential surface of the spacer 20 and the inner circumferential surface of the engaging concave section 19. In this case, when the fitting strength is too high, and pivotal displacement of the spacer 20 with respect to the spherical engaging section 21 is not performed smoothly, there will be strong rubbing between the outer circumferential surface of the spacer 20 and the inner circumferential surface of the engaging concave section 19, and there is a possibility that noise or vibration will occur, causing the passengers in the automobile to experience an uncomfortable feeling. Particularly, in this state, the surface that allows relative displacement in the axial direction of the transmission member 17 between the transmission member 17 and the moving piece 16 is limited to only one location between the outer circumferential surface of the spacer 20 and the inner circumferential surface of the engaging concave section 19, so the rubbing length easily becomes long, which makes it even easier for noise and vibration to occur.

Performing high precision processing of the inner circumferential surface of the spacer 20, which is a spherical concave surface, and the outer circumferential surface of the spherical engaging section 21, which is a spherical convex section, in order to prevent the occurrence of noise and vibration is connected to higher costs. Moreover, when manufacturing the spherical engaging section 21 with high precision, it is not possible to avoid the outer diameter of the transmission member 17 becoming small on the base-end section of the spherical engaging section 21. It is easy for large stresses to occur in the neck section of this transmission member 17 during adjustment of the forward-backward position of the steering wheel 1, and so such construction as this is not advantageous from the aspect of maintaining sufficient durability when used over a long period of time.

As construction for preventing the occurrence of noise and vibration in the portion of the steering column apparatus, JP 5,076,908 (B2), for example, discloses a mechanism as illustrated in FIG. 24 in which holding holes 22 are provided in part in the axial direction of the outer column 6b, and adjustment screws 24 that are screwed into female threads 23 that are formed in the holding holes 22 press synthetic resin pads 26 that come in contact with the outer circumferential surface of the inner column 7b by way of disc springs 25, which prevents looseness of the portion that constitutes the steering column apparatus. However, in this mechanism, when the force by which the pads 26 press against the outer circumferential surface of the inner column 7b is made large enough to be able to prevent looseness, the drive load on the electric motor increases, and there is a problem in that the operation noise becomes large.

RELATED LITERATURE

Patent Literature

[Patent Literature 1] JP 2010-116042 (A)
[Patent Literature 2] JP 2006-297989 (A)
[Patent Literature 3] JP 5,076,908 (B2)
[Patent Literature 4] JP H09-323658 (A)
[Patent Literature 5] JP H10-119793 (A)
[Patent Literature 6] JP 2005-255040 (A)
[Patent Literature 7] JP 2009-006743 (A)
[Patent Literature 8] JP 2010-116042 (A)
[Patent Literature 9] DE 10251764 (A1)

SUMMARY OF INVENTION

Problem to be Solved by Invention

The object of the present invention is to provide at low cost construction of an electric steering wheel position adjustment apparatus that improves the rigidity of the portion that constitutes the steering column apparatus, so that the driver operating the steering wheel does not experience an unpleasant feeling, and that is capable of performing position adjustment of the steering wheel stably and smoothly.

Means for Solving Problems

The electric steering wheel position adjustment apparatus of the present invention has:
  a steering shaft that has a rear-end section which a steering wheel is supported by and fastened to;
  a column unit that extends in the axial direction of the steering shaft, that rotatably supports the steering shaft on the inside thereof, and that has:
    a support section supported by a portion that is fastened to a vehicle body or to a vehicle body-side bracket that is supported by the portion that is fastened to the vehicle body, the support section not being displaced during position adjustment of the steering wheel; and
    an adjusted section supported by the support section so as to be displaceable in the axial direction of the steering shaft together with at least part of the steering shaft during position adjustment of the steering wheel;
  an electric actuator that is fastened to the bottom side of the support section, that has an electric motor as the drive source, and that causes the adjusted section to be displaced in the axial direction with respect to the support section; and mechanisms that push the adjusted section downward, and that are provided in at least two locations on the top side of the support section that are separated in the forward-backward direction of the column unit.

In the apparatus of the present invention, preferably a pair of preloaded angular ball bearings having back-to-back contact angles are located between both end sections in the forward-backward direction of the adjusted section and at least part of the steering shaft, and the pair of ball bearings rotatably support the at least part of the steering shaft with respect to the adjusted section in a state that displacement in the axial direction of the steering shaft with respect to the adjusted section is prevented.

Preferably, the both end sections in the forward-backward direction of the adjusted section are constructed by reduced-diameter sections having diameters that are smaller than the diameter of the middle section in the forward-backward direction of the adjusted section, the middle section in the forward-backward direction of the adjusted section is constructed by a middle cylindrical section having an outer diameter that does not change in the axial direction of the adjusted section, the pair of ball bearings are located between the inner circumferential surfaces of the both end sections in the forward-backward direction of the adjusted section and the outer circumferential surface of the at least part of the steering shaft, and the mechanisms that push the adjusted section downward are provided on the support section so as not to separate from the middle cylindrical section regardless of displacement of the adjusted section in the axial direction with respect to the support section.

Preferably, in the apparatus of the present invention, each of the mechanisms that push the adjusted section downward has:

a holding hole that is formed so as to pass through between or communicate the inner circumferential surface and the outer circumferential surface of the support section;

a sliding plate;

an elastic member; and a cover;

the sliding plate, the elastic member and the cover being assembled in the holding hole in order from the inside in the radial direction of the support section, and the elastic member is elastically compressed between the sliding plate and the cover such that the sliding plate pushes the outer circumferential surface of the adjusted section.

Preferably the spacing in the axial direction of the mechanisms that push the adjusted section downward is essentially equal to the maximum range of movement of the adjusted section in the axial direction of the support section.

Preferably, the electric actuator has:

a forward-backward feed screw rod that is arranged parallel with the adjusted section and that is rotated and driven by the electric motor;

a moving piece that is screwed onto the forward-backward feed screw rod and that moves in the forward-backward direction according to the rotation of the forward-backward feed screw rod; and a transmission member, the tip-end section thereof being connected to the moving piece, and the base-end section thereof being joined to the middle cylindrical section of the adjusted section, and that transmits the movement of the moving piece to the adjusted section.

In this case, preferably an engaging concave section is provided in the moving piece; the tip-end section of the transmission member engages with the engaging concave section of the moving piece by way of a spacer; the engaging concave section of the moving piece has an inner circumferential surface that is a cylindrical concave surface having an inner diameter that does not change in the axial direction of the transmission member; the tip-end section of the transmission member has an outer circumferential surface that is a cylindrical convex surface having an outer diameter that does not change in the axial direction of the transmission member; and the spacer has an outer circumferential surface that is a cylindrical convex surface having an outer diameter that does not change in the axial direction of the transmission member and an inner circumferential surface that is a cylindrical concave surface having an inner diameter that does not change in the axial direction of the transmission member.

The present invention is particularly and suitably applied to an electric steering wheel position adjustment apparatus, in which the steering shaft, has integrated construction of which the overall length does not expand or contract, and the adjusted section has a steering column having integrated construction of which the overall length does not expand or contract; and further has:

an expandable intermediate shaft that transmits the rotation of the steering shaft to an input shaft of a steering gear unit; and a universal joint that connects the front-end section of the steering shaft, and the rear-end section of the intermediate shaft, and the electric actuator causes the steering column to be displaced in the axial direction of the steering column, causing the steering shaft to move in the forward-backward direction, and the movement of the steering shaft is compensated by causing the intermediate shaft to expand or contract.

However, the present invention can also be applied to construction in which a steering shaft has an inner shaft, and an outer shaft, which constitutes the at least part of the steering shaft, and that fits around the inner shaft so as to be able to slide in the axial direction of the steering shaft, and so as to be able to transmit torque to the inner shaft; the support section has an outer column; the adjusted section has an inner column that fits inside the outer column so as to be able to slide in the axial direction of the adjusted section, the front-end section of the inner shaft is connected to an intermediate shaft by way of a universal joint; the steering wheel is supported by and fastened to the rear-end section of the outer shaft; and the outer shaft displaces in the forward-backward direction together with the inner column during adjustment of the forward-backward position of the steering wheel.

Effect of the Invention

With the present invention, an electric steering wheel forward-backward position adjustment apparatus is provided that improves the support rigidity of the steering column apparatus area thereof, and makes it possible to perform steering wheel position adjustment smoothly without the driver experiencing an uncomfortable or unpleasant feeling.

In other words, mechanisms that elastically push a portion (adjusted section) of a column unit of the steering column apparatus that is displaced in the forward-backward direction together with at least part of the steering shaft downward with respect to the structure (support section) that supports the portion are provided in at least two locations on the top side of the support section that are separated in the forward-backward direction, so it is possible to suppress looseness between these members; and in the steering column apparatus, it is possible to improve the support rigidity in the area of fit of the adjusted section and the support section.

Particularly, by constructing both the steering shaft and steering column with non-expandable integrated construction, the rigidity of the steering shaft and steering column of the steering column apparatus is maintained, and thus the support rigidity of the steering column apparatus is further achieved.

MODES FOR CARRYING OUT INVENTION

First Example

Figure 21:
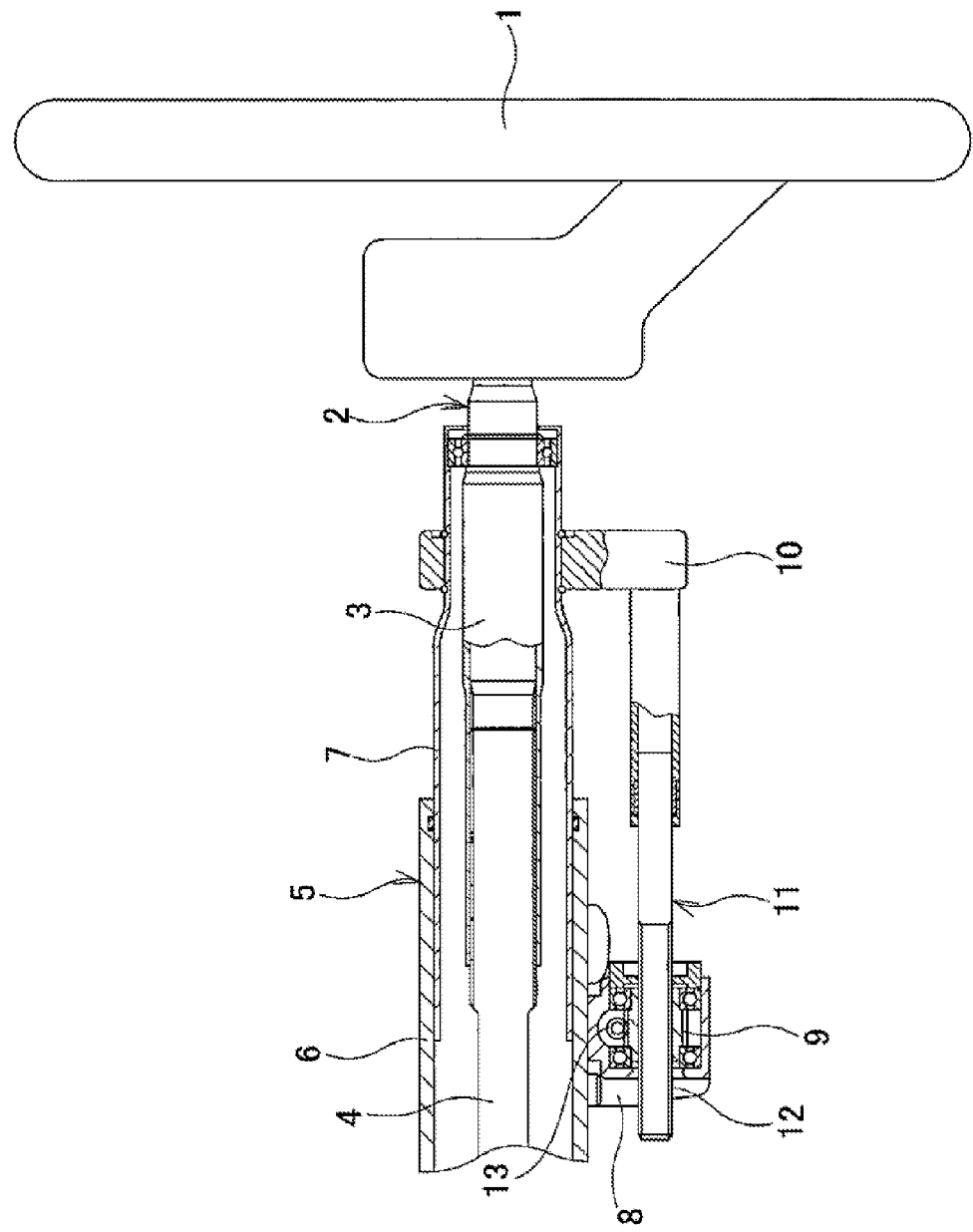
FIG. 21 is a partial vertical cross-sectional side view illustrating a first example of conventional construction.
Figure 22:
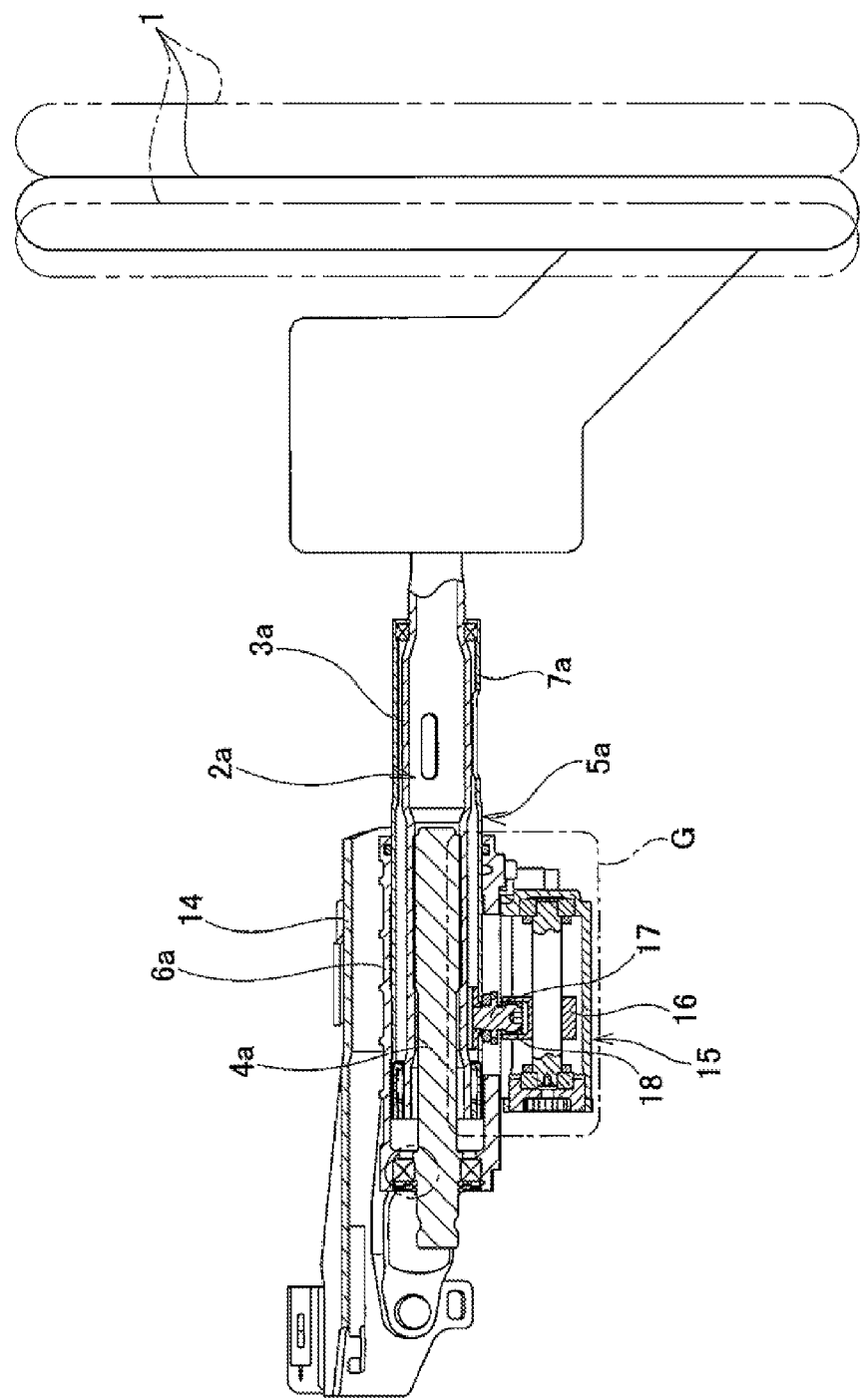
FIG. 22 is a vertical cross-sectional side view illustrating a second example of conventional construction.
Figure 23:
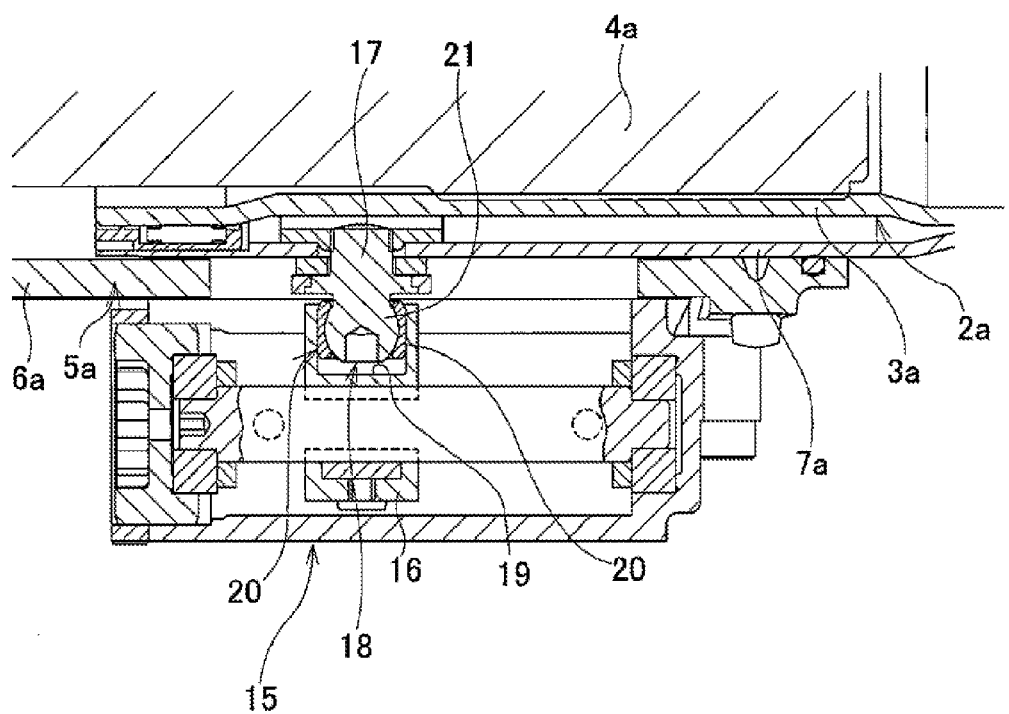
FIG. 23 is an enlarged view of part G in FIG. 22.
Figure 24:
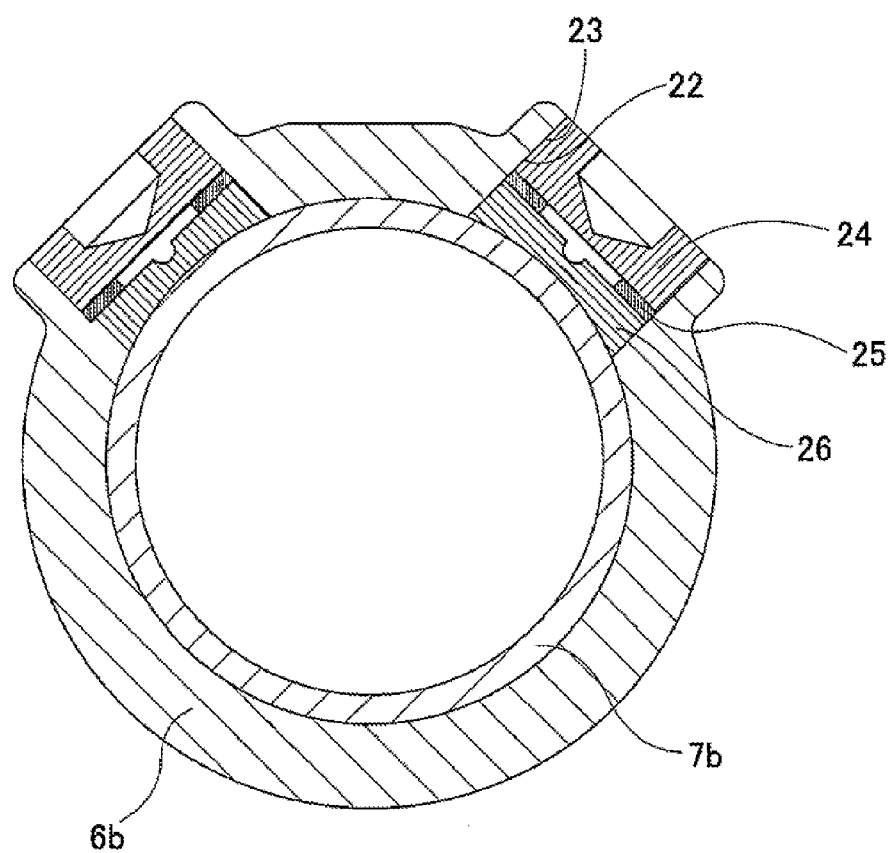
FIG. 24 is a partial cross-sectional drawing illustrating a conventional gap adjustment mechanism for adjusting the gap between the outer column and inner column that can be applied to the first example and second example of conventional construction.

FIG. 1 to FIG. 18 illustrate a first example of an embodiment of the present invention. The electric steering wheel position adjustment apparatus of this example has a steering shaft 2b and a cylindrical steering column 5b, neither of which is expandable or contractible, in a section thereof that functions as a steering column apparatus. In the construction of this example, the forward-backward position and up-down position of the steering wheel (see FIG. 21) that is supported by and fastened to the rear-end section of the steering shaft 2b that protrudes from the opening on the rear end of the steering column 5b can each be adjusted within a specified range, however, forward-backward position adjustment of the steering wheel 1 is achieved by moving the overall steering shaft 2b and steering column 5b in the axial direction. Therefore, in this example, the overall steering column 5b corresponds to an adjusted section of the column unit of the present invention.

Figure 1:
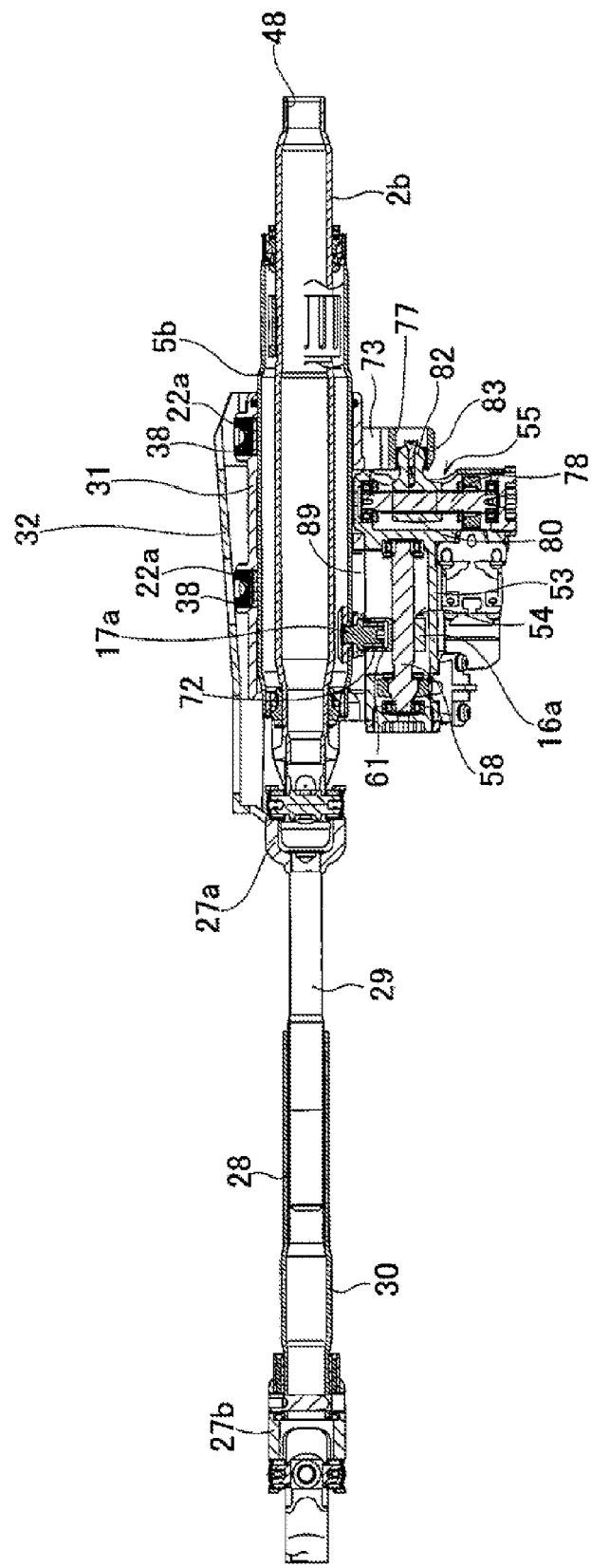
FIG. 1 is a vertical cross-sectional side view illustrating a first example of an embodiment of the present invention.
Figure 6:
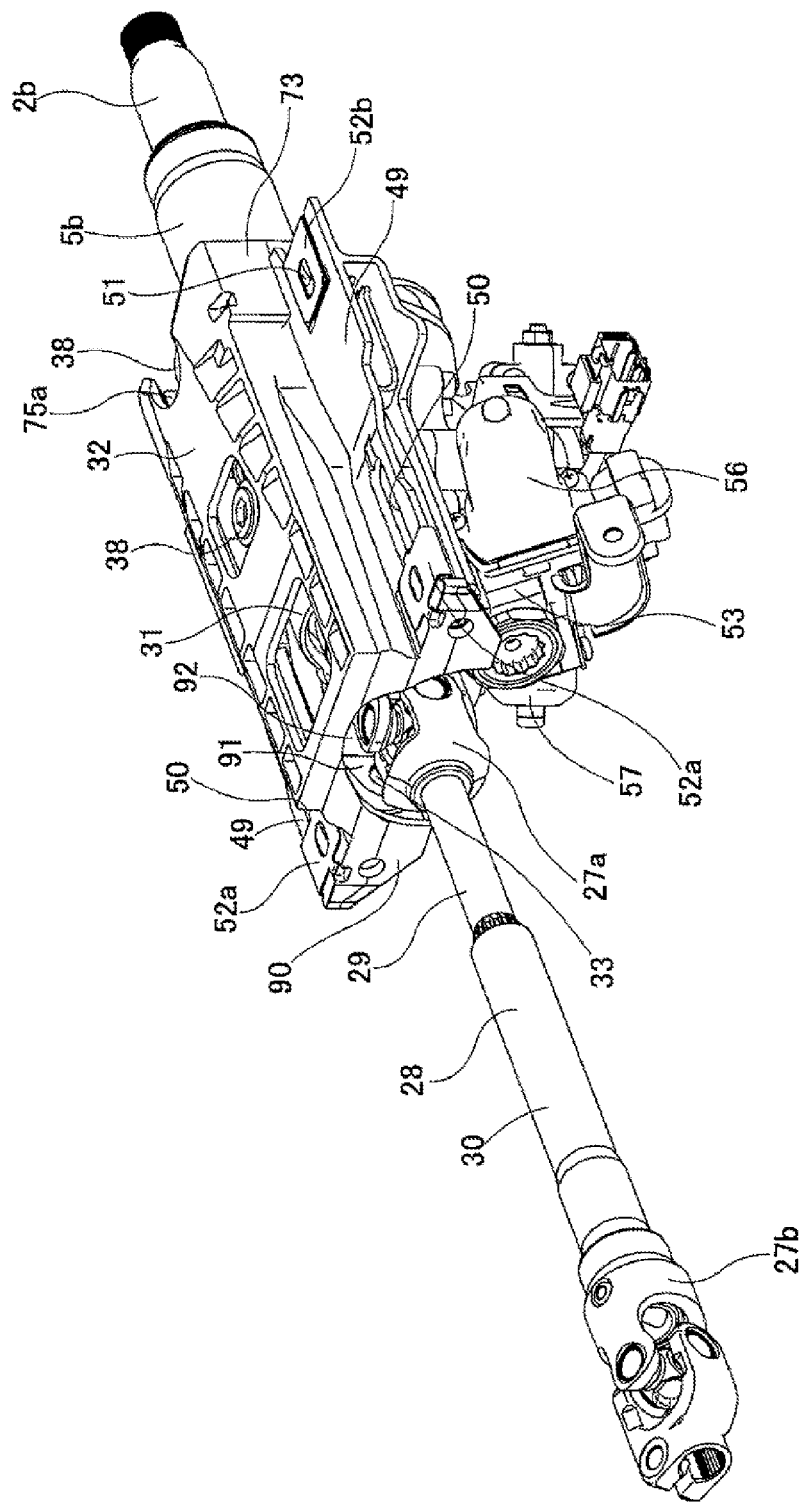
FIG. 6 is a perspective view illustrating the first example as seen from above in the front.

In the construction of this example, the overall length of the steering shaft 2b does not expand or contract, however the steering shaft 2b is able to move in the axial direction (forward-backward direction) of the steering shaft, so as illustrated in FIG. 1 and FIG. 6, as an intermediate shaft 28 that is linked to the front-end section of the steering shaft 2b by way of a universal joint 27a so as to be able to transmit torque, construction is employed in which the end sections of an intermediate inner shaft 29 and intermediate outer shaft 30 fit together using a spline fit such that torque can be transmitted and the overall length can be expanded and contracted. In other words, by expanding or contracting the intermediate shaft 28, movement in the forward-backward direction of the steering shaft 2b is compensated for. The front-end section of the intermediate shaft 28 is linked to an input shaft (omitted in the figure) of a steering gear unit for applying a steering angle to the steered wheels (front wheels) by way of another universal joint 27b.

Figure 3:
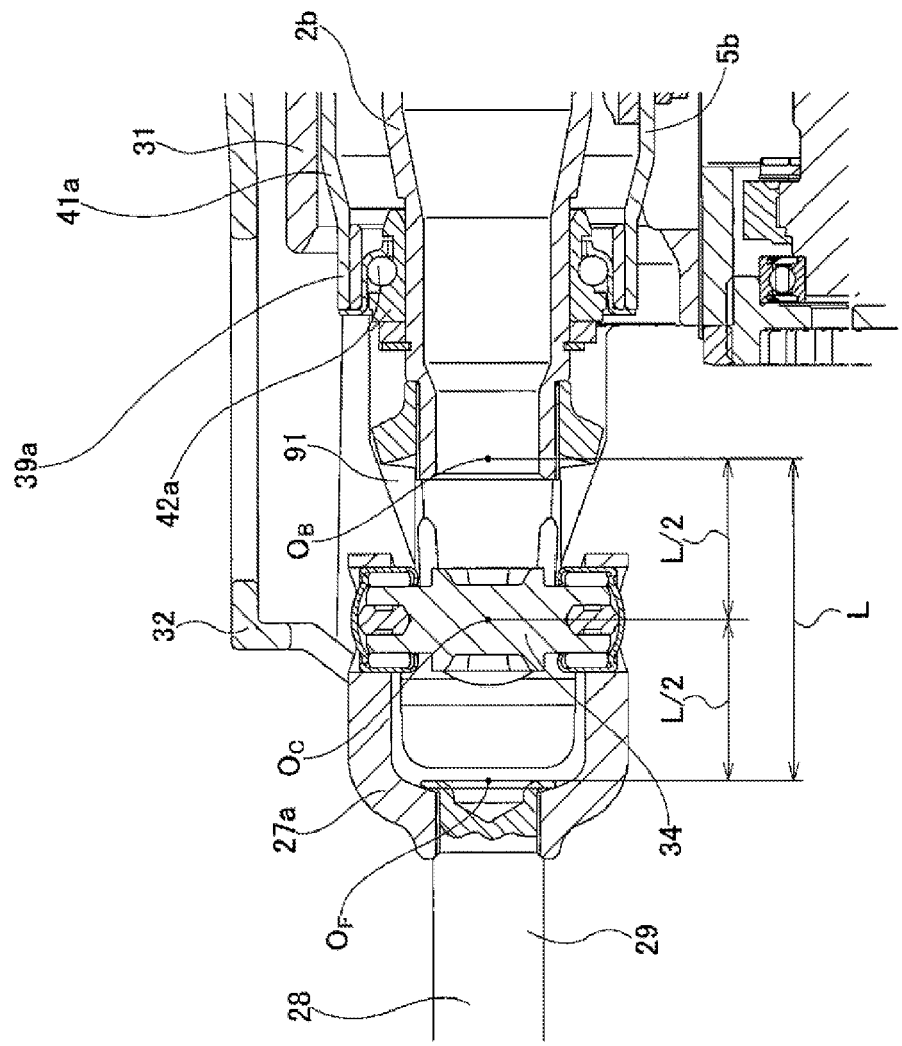
FIG. 3 is an enlarged view of part A in FIG. 2.

In the construction of this example, the installation position of the universal joint 27a that links the front-end section of the steering shaft 2b and the rear-end section of the intermediate shaft 28 is appropriately regulated such that during position adjustment of the steering wheel 1, the amount of relative displacement between the steering shaft 2b and the intermediate shaft 28 is kept to minimum, and such that the position adjustment of the steering wheel 1 can be performed smoothly. More specifically, in order support a column holder 31 that holds the steering column 5b so as to be able to be pivotally displaced with respect to a vehicle body-side bracket 32, a pair of left and right tilt shafts 33 (see FIG. 9 and FIG. 11) that are concentric with each other and the steering shaft. 2b are located in positions such that the center axes of each are orthogonal with each other. Furthermore, as illustrated in FIG. 3, the center axis $O_C$ of the pair of tilt shafts 33 is located in the center position in the forward-backward direction between the center position $O_F$ of displacement on the front-end side of the universal joint 27a and the center position $O_B$ of displacement on the rear-end side.

The center position $O_F$ of displacement on the front-end side is the center position of displacement of the universal joint. 27a, or in other words, the center point position of the joint cross 34 of the universal joint 27a, in a state in which the steering wheel 1 is displaced to the front-end position of the adjustable range. The center position $O_B$ of displacement on the rear-end side is the center position of displacement of the universal joint 27a in a state in which the steering wheel 1 is displaced to the rear-end position of the adjustable range. In this example, the center axis $O_C$ of the pair of tilt shafts 33 is located in the center position of the line segment that connects the center position $O_F$ of displacement on the front-end side and the center position $O_B$ of displacement on the rear-end side. Therefore, when the length of the line segment that connects the center position $O_F$ of displacement on the front-end side and the center position $O_B$ of displacement on the rear-end side is taken to be L, the distances between the center axis $O_C$ of the pair of tilt shafts 33 and the center position $O_F$ of displacement on the front-end side and the center position Os of displacement on the rear-end side are each L/2. However, even when the center axis $O_C$ of the pair of tilt shafts 33 is shifted by ±L/10, or preferably by ±L/20, from the position in the figure, the center axis $O_C$ of the pair of tilt shafts 33 is located in nearly the center position between the center position $O_F$ of displacement on the front-end side and the center position $O_B$ of displacement on the rear-end side, so there is no particular problem.

Figure 4:
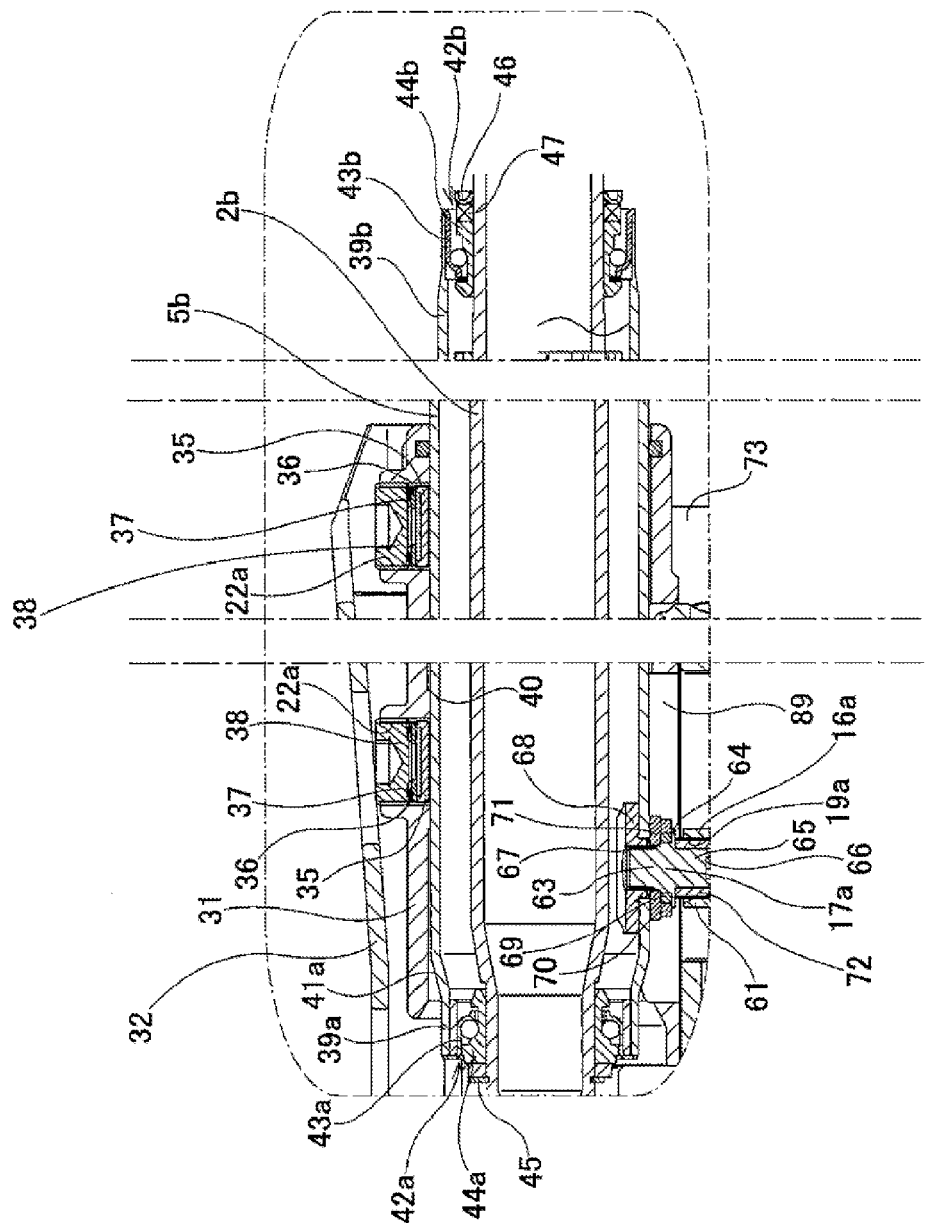
FIG. 4 is an enlarged view of part B in FIG. 2.
Figure 14:
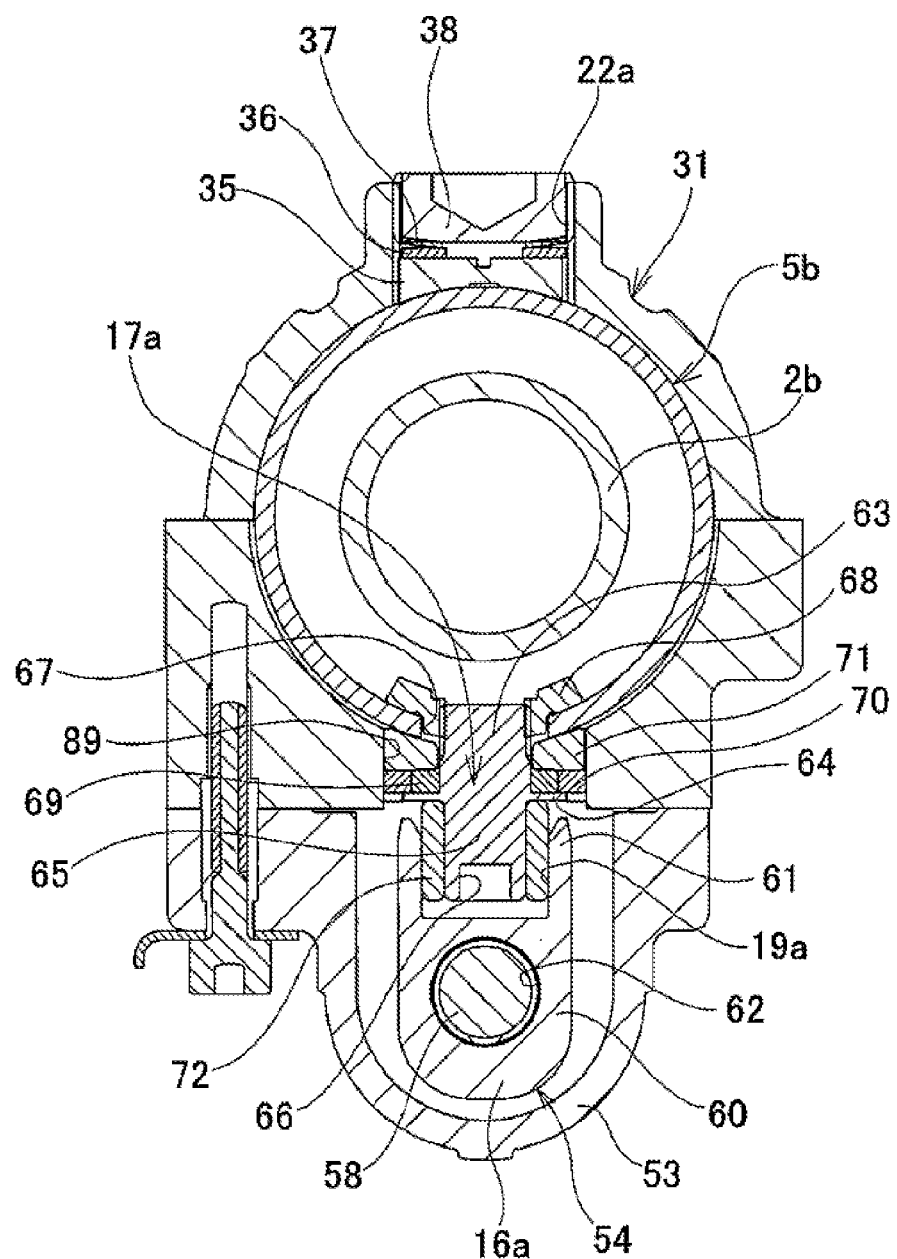
FIG. 14 is an enlarged cross-sectional drawing of section D-D in FIG. 2.

The column holder 31 that holds the steering column 5b so that displacement of the steering column 5a in the axial direction (forward-backward direction) is possible is formed into a hollow body shape, or more specifically, a substantially cylindrical shape by die casting a light metal alloy, for example. The column holder 31 corresponds to a support section that constitutes the section of the steering column apparatus of the present invention. In order to eliminate looseness of the steering column 5b with respect to the column holder 31, holding holes 22a are formed in two locations that are separated in the forward-backward direction on the tip surface of the column holder 31 so as to pass through between the inner circumferential surface and outer circumferential surface of the column holder 31. As illustrated in FIG. 4 and FIG. 14, a sliding plate 35, a washer 36 and a disc spring 37 are installed on the inside of the each of the holding holes 22a, and the opening section on the top end of each holding hole 22a is covered by a screw cover 38. The sliding plate 35 is made of a high polymer material such as a synthetic resin like polyacetal (POM) or a synthetic rubber having excellent sliding properties. In this state, the sliding plates 35 that are located in the end section on the radially inside of the holding holes 22a are pressed against the outer circumferential surface (top surface) of the steering column 5b by the elastic force of the disc springs 37, so that the steering column 5b is not loose inside the column holder 31. The spacing in the axial direction of the mechanisms for preventing looseness of the steering column 5b is arbitrary, however, in this example, the spacing in the axial direction of the mechanisms is essentially the same as the maximum movable range in the axial direction of the steering unit.

In this example, from the aspect of maintaining the required rigidity, the steering column 5b is integrally formed into a hollow body shape using an extruded pipe or seam welded pipe made of an aluminum alloy or iron-based alloy. However, it is also possible to employ construction in which plural elements are combined by welding or fitting. In this example, the steering column 5b has a substantially cylindrical shape, but is not limited to this. By performing a drawing process on both end sections in the forward-backward direction of the steering column 5b, reduced-diameter sections 39a, 39b having outer diameters that are smaller than the outer diameter of the middle section in the forward-backward direction are formed. Moreover, the middle section in the forward-backward direction of the steering column 5b is taken to be a middle cylindrical section 40 having an outer diameter that does not change in the axial direction, and both end sections in the forward-backward direction of this middle cylindrical section 40 are continuous with the reduced-diameter sections 39a, 39b by inclined surface sections 41a, 41b. The length in the axial direction of the middle cylindrical section 40 and the installation positions of the holding holes 22a are regulated by the relationship with the amount of adjustment in the forward-backward direction of the steering wheel 1, and the sliding plates 35 do not separate from the middle cylindrical section 40 regardless of the displacement in the axial direction of the steering column 5b with respect to the column holder 31.

The steering shaft 2b is integrally formed into a cylindrical shape or circular rod shape using drawn pipe or seam welded pipe made of an iron-based alloy, or an extruded pipe or drawn pipe made of an aluminum alloy, however, as in the case of the steering column 5b, it is also possible to employ construction in which plural elements are combined by welding or fitting. The steering shaft 2b is supported on the radially inside of the steering column 5b by a pair of ball bearings 42a, 42b that are located on both end sections in the forward-backward direction in a state such that displacement in the axial direction with respect to the steering column 5b is prevented.

A pair of angular ball bearings 42a, 42b that have back-to-back contact angles and that are preloaded, are located between the inner circumferential surface of the reduced-diameter sections 39a, 39b, and the outer circumferential surface of the portions near both ends of the middle section of the steering shaft 2b. Therefore, in this example, as illustrated in FIG. 4, the outer rings 43a, 43b of the pair of ball bearings 42a, 42b are fastened around the edge sections on the openings of the reduced-diameter sections 39a, 39b in a state such that displacement in a direction toward each other is prevented. Moreover, the inner ring 44a of the ball bearing 42a on the front side is fastened around the portion near the front end of the middle section of the steering shaft 2b by a retaining ring 45 that is fastened around the steering shaft 2b so that displacement in the forward direction is prevented. On the other hand, the inner ring 44b of the ball bearing 42b on the rear side is fastened around the steering shaft 2b with a loose fit by a push nut 46 in a state such that displacement in the backward direction is prevented. An elastic member 47 such as a disc spring is held between the surface on the front side of the push nut 46 and the rear-end surface of the inner ring 44b, and this elastic member 47 applies an elastic force on the inner ring 44b in the forward direction. With this kind of construction, the steering shaft 2b is supported on the radially inside of the steering column 5b in a state such that displacement in the axial direction is prevented, and so as to be able to rotate freely with no looseness.

In this example, back-to-back angular ball bearings instead of deep-groove ball bearings are used as the pair of ball bearings 42a, 42b, and are installed in a state being preloaded from the axial direction of the steering shaft 2b. Therefore, the preloading makes it possible to prevent looseness of the bearings, and it is possible to reduce the rotation torque of the bearings, so a steering apparatus having good steering stability of the steering wheel 1 is achieved. Moreover, a push nut 46 is used for fastening the inner ring 44b on the rear side, so there is no need to form a fastening groove on the rear-end section of the steering shaft 2b where it is easy for large forces to be applied from the steering wheel 1. Therefore, it is possible to maintain the strength and rigidity of the rear-end section of the steering shaft 2b without having to increase the thickness of the steering shaft 2b. A screw hole 48 is provided on the rear-end section of the steering shaft 2b, and by using this screw hole 48, the steering wheel 1 is fastened to and supported by the steering shaft 2b, and the diameter of the rear-end section of the steering shaft 2b is sufficiently maintained.

Figure 9:
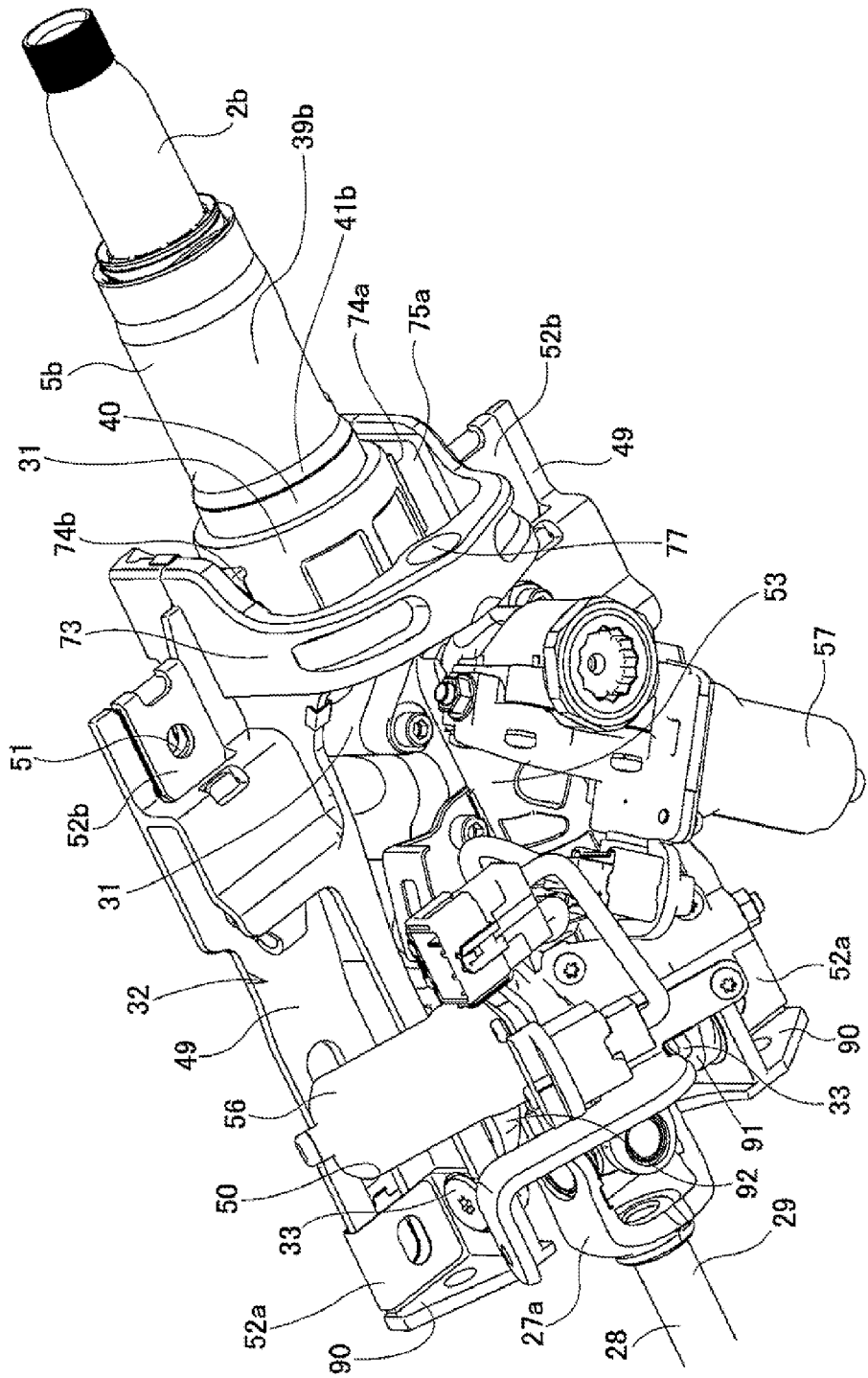
FIG. 9 is a perspective view that illustrates the right half in FIG. 6 as seen from below.
Figure 11:
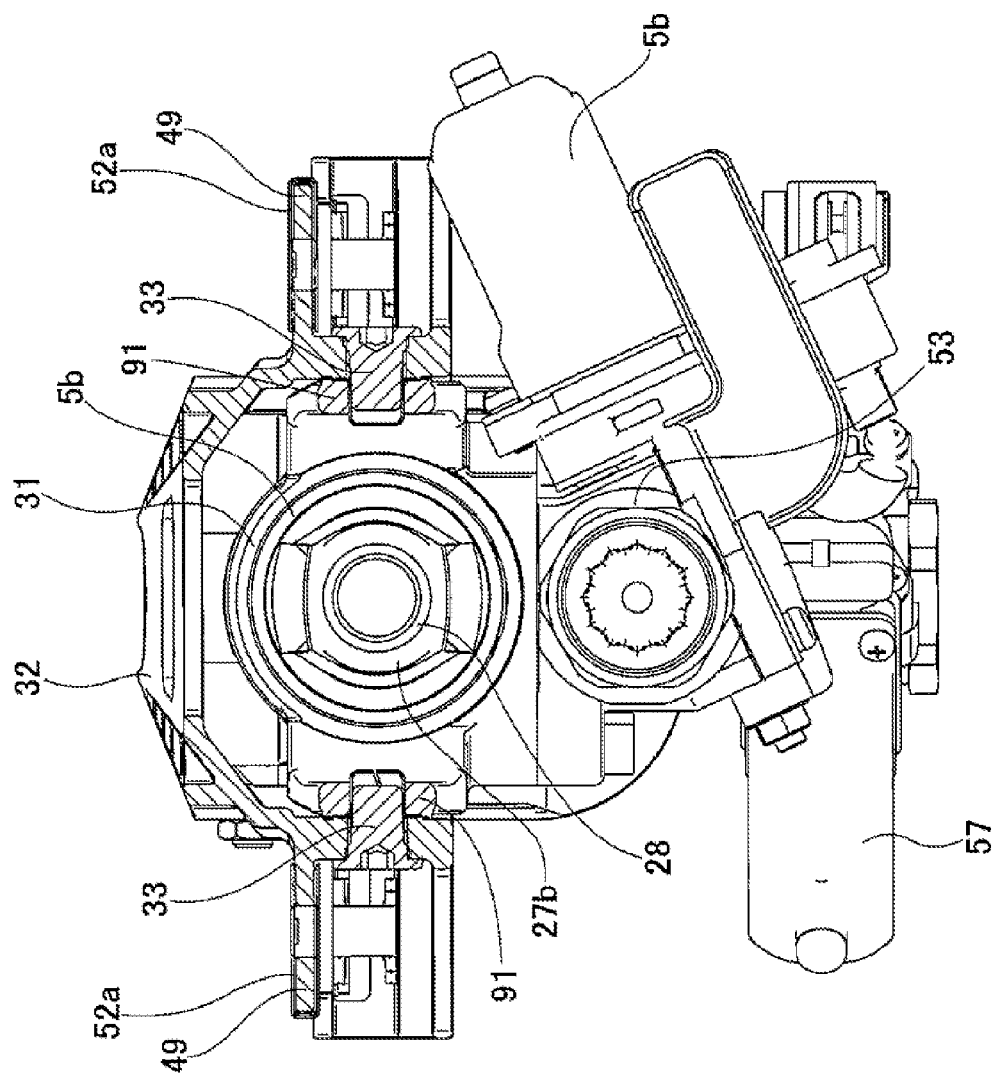
FIG. 11 is a partial cross-sectional drawing that illustrates the first example as seen from the left in FIG. 1.
Figure 12:
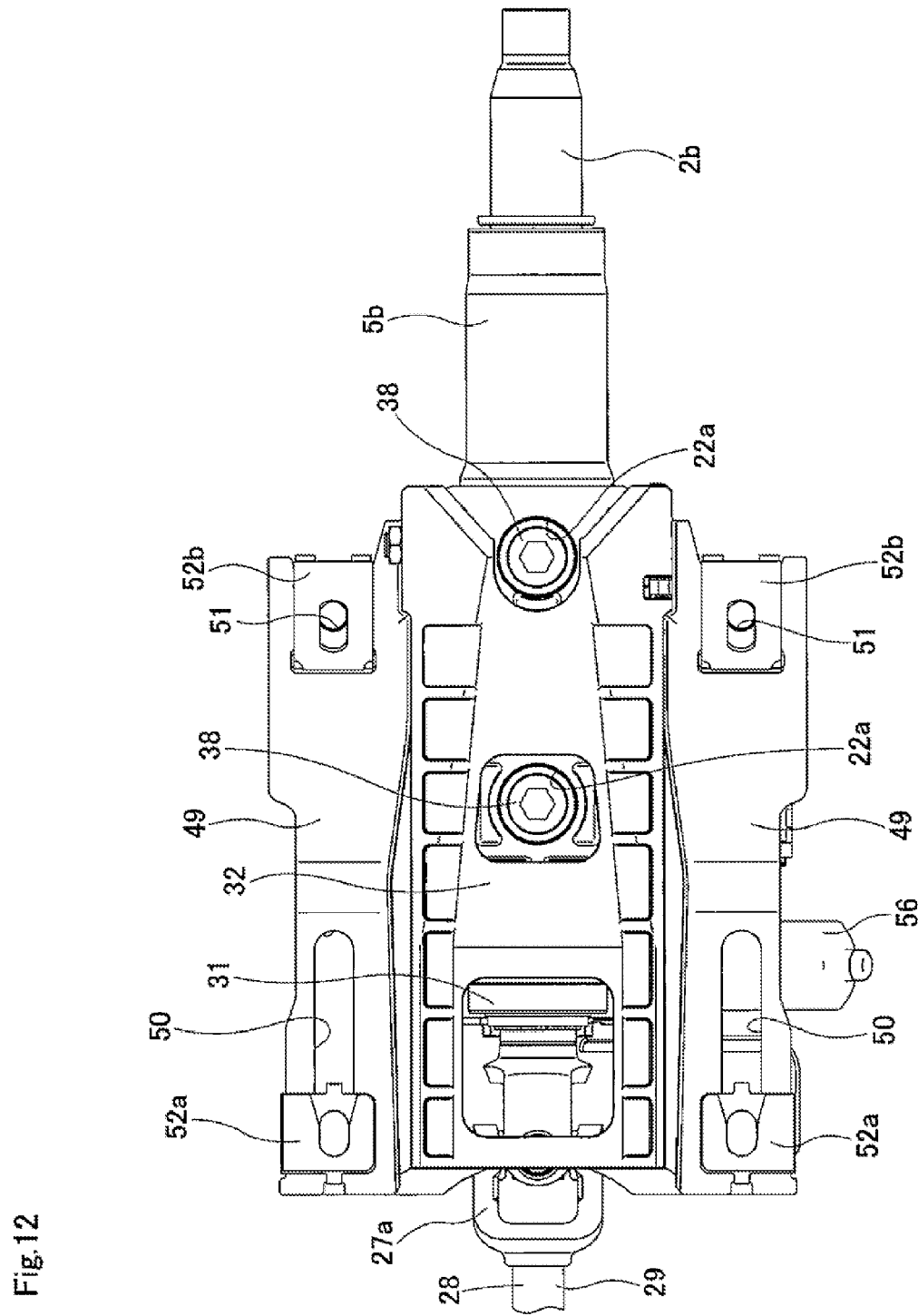
FIG. 12 is a top view illustrating the first example as seen from above in FIG. 2.
Figure 13:
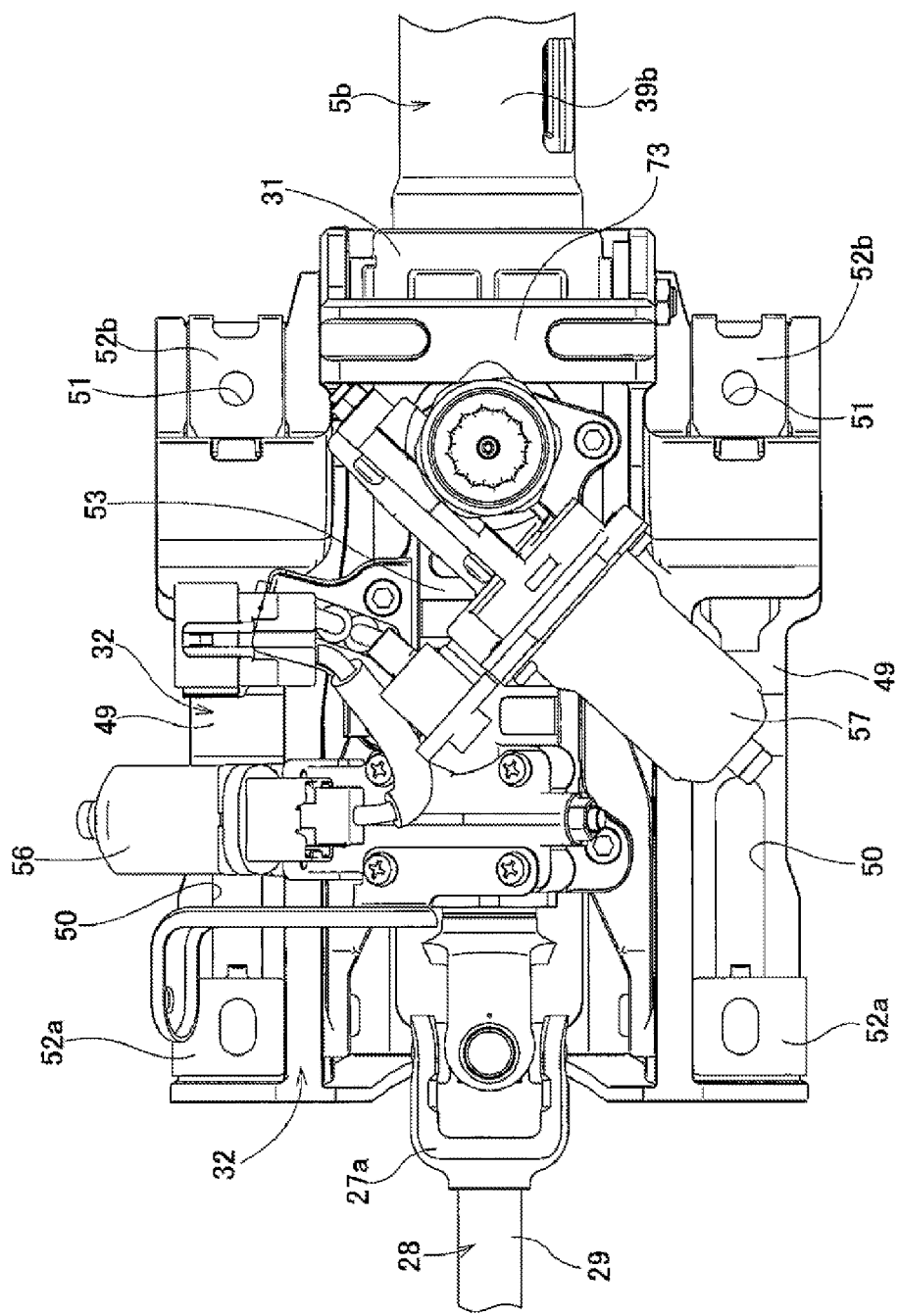
FIG. 13 is a bottom view illustrating the first example as seen from below in FIG. 2.

As illustrated in FIG. 9 and FIG. 11, the column holder 31 is supported by the vehicle body-side bracket. 32 by the pair of tilt shafts 33 that are provided on both sides of the front-end section of the column holder so as to be concentric with each other, and the column holder 31 is able to be pivotally displaced around these tilt shafts 33. The vehicle body-side bracket 32 is integrally formed by die cast molding of a light metal alloy for example, and is supported by a portion that is fastened to the vehicle body so that displacement in the forward direction due to an impact load that is applied during a secondary collision is possible. In order for this, a pair of left and right installation plate sections 49 are provided on the vehicle body-side bracket 32, long holes 50 that extend in the forward-backward direction are formed in the front sections of the installation plate sections 49, and notches 51 that are open on the rear-end edges of the installation plate sections 49 are formed in the rear-end sections. Sliding plates 52a, 52b are fastened to each of the long holes 50 and notches 51, and by the way of bolts or studs that are inserted in through holes in these sliding plates 52a, 52b, the pair of installation plate sections 49 are fastened to and supported by a portion that is fastened to the vehicle body. In this state, the vehicle body-side bracket 32 is always firmly supported by a portion that is fastened to the vehicle body, however, when a large impact load is applied in the forward direction during a secondary collision, the vehicle body-side bracket 32 is displaced in the forward direction within the range that the bolts or studs are able to be displaced inside the long holes 50.

An actuator case 53 that is manufactured separately from the steering column 5b is joined and fastened to a portion of the column holder 31 that is on the bottom side of the steering column 5b using plural bolts.

Figure 2:
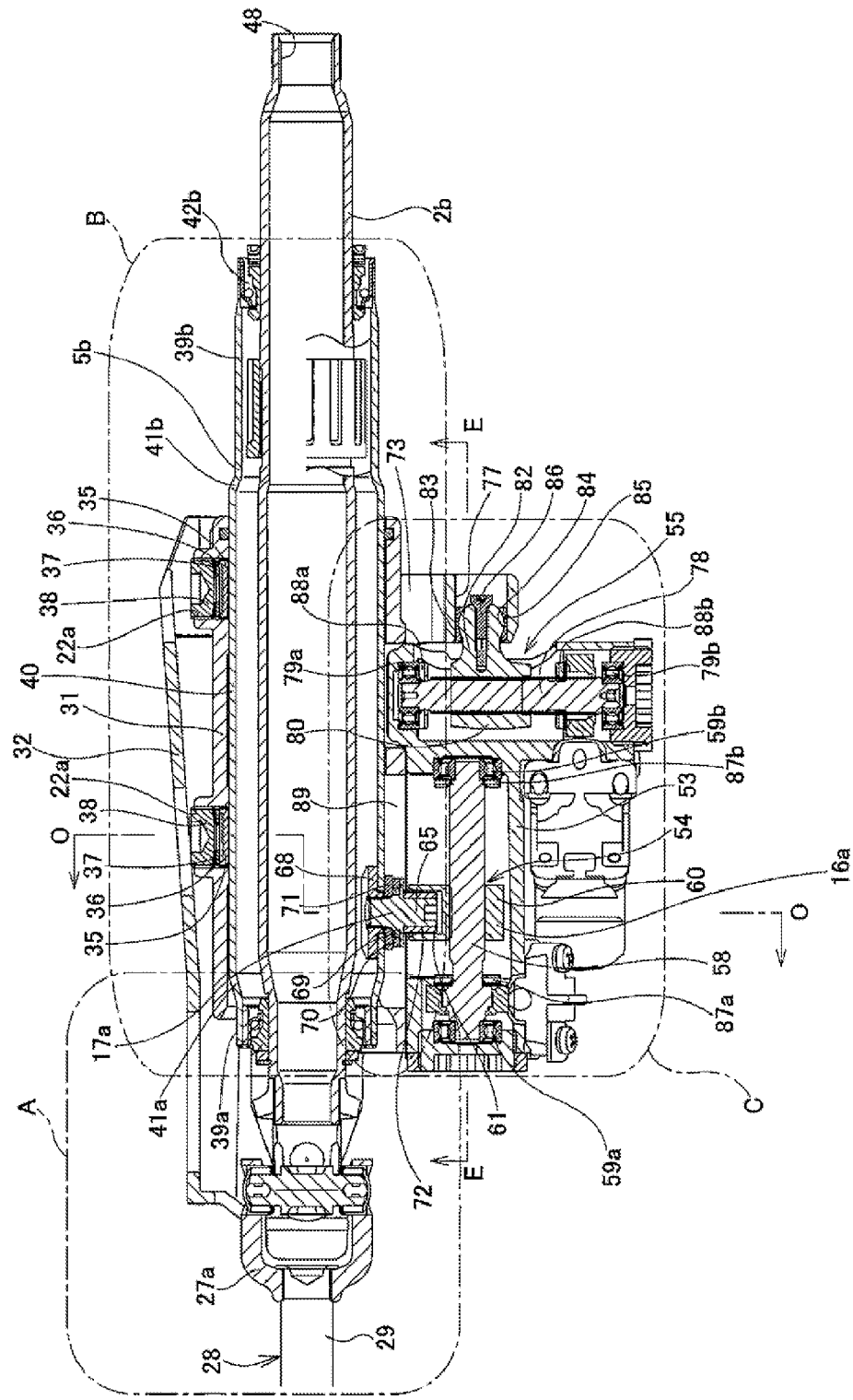
FIG. 2 is an enlarged view of the right half in FIG. 1.
Figure 5:
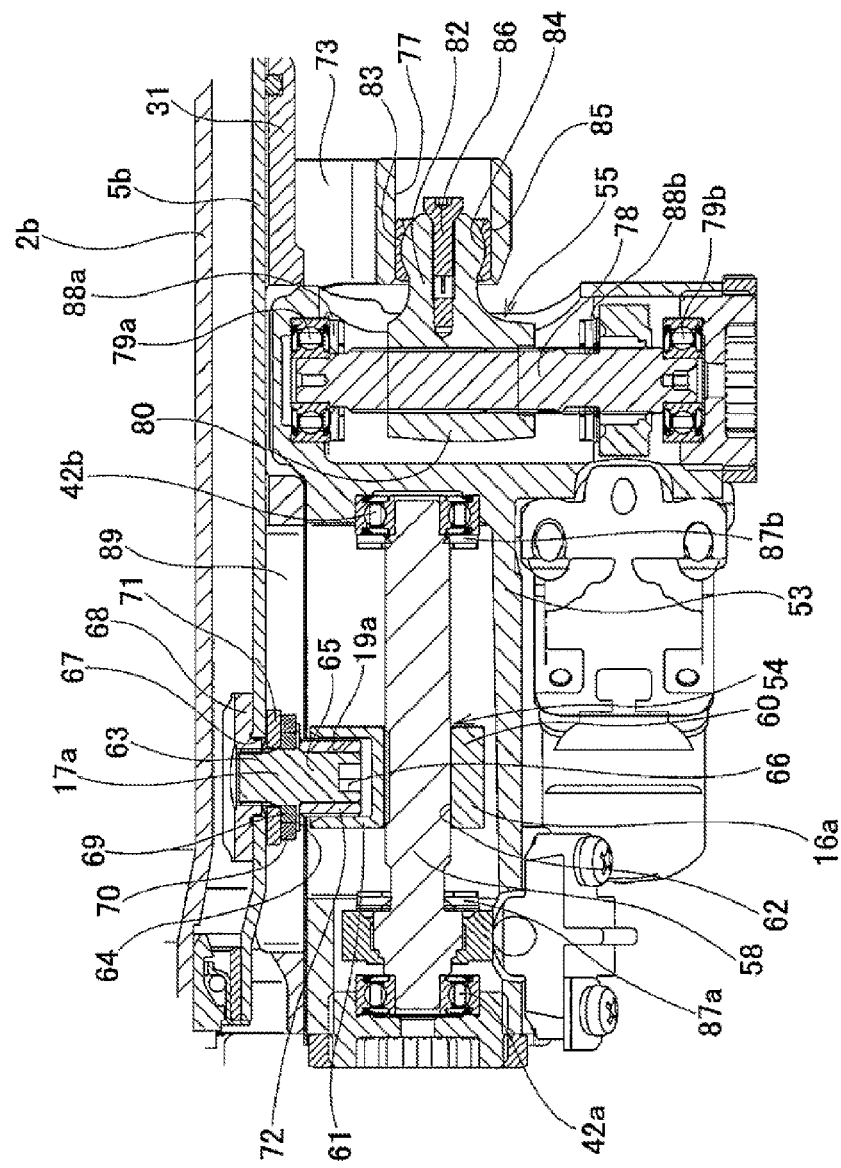
FIG. 5 is an enlarged view of part C in FIG. 2.
Figure 16:
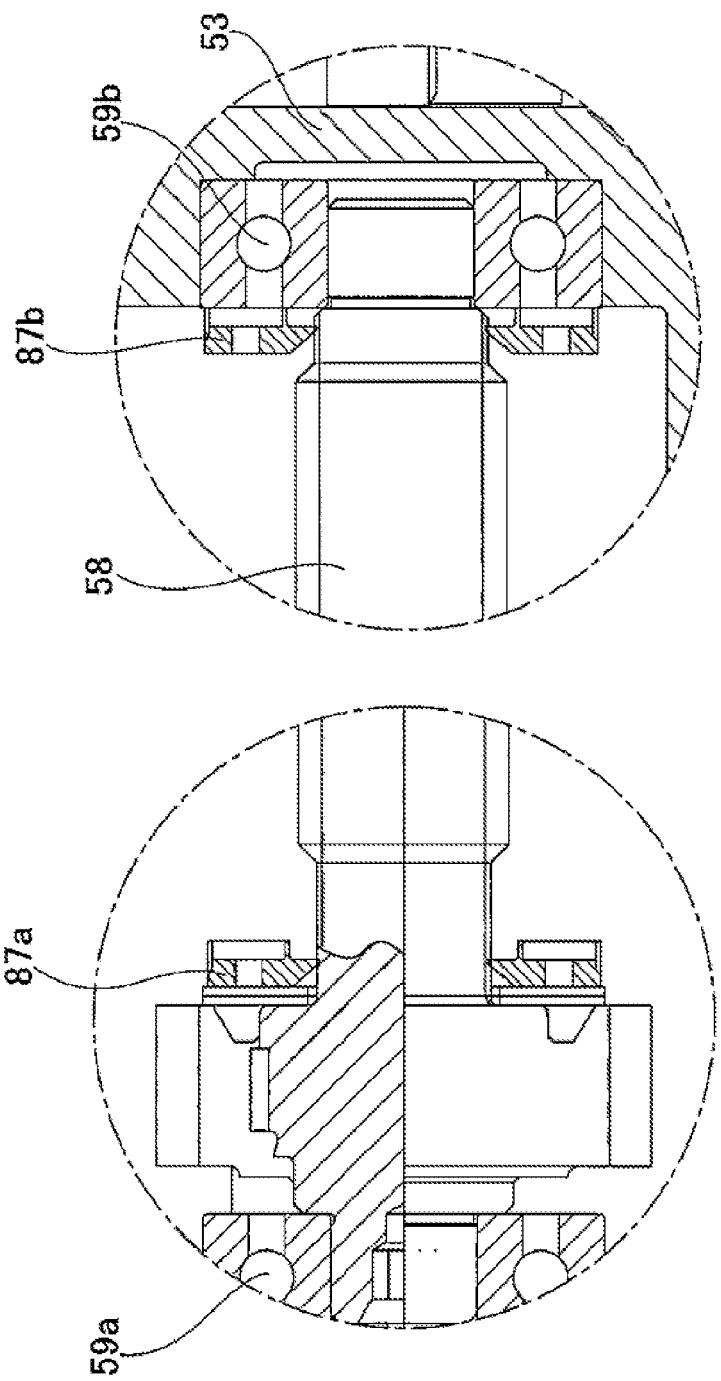
FIG. 16 is a partial enlarged cross-sectional drawing of the support section of both the front and rear ends of a screw rod for forward-backward position adjustment as seen from the same direction as in FIG. 1 and FIG. 2.

As illustrated in FIG. 2 and FIG. 5, a forward-backward feed screw apparatus 54 and an up-down feed screw apparatus 55 that constitute an electric actuator are provided inside the actuator case 53. In this example, a forward-backward position adjustment actuator is formed by the forward-backward feed screw apparatus 54 and a forward-backward electric drive motor 56. The forward-backward feed screw apparatus 54, with the forward-backward electric drive motor 56 as a drive source, causes the steering column 5b to be displaced in the forward-backward direction, and has a forward-backward feed screw rod 58 that is arranged parallel with the steering column 5b, and a moving piece 16a that has a forward-backward feed nut that screws onto the forward-backward feed screw rod 58. As illustrated in FIG. 5 and FIG. 16, both the front and rear end sections of the forward-backward feed screw rod 58 are supported by the actuator case 53 by way of a pair of ball bearings 59a, 59b such that displacement in the axial direction is prevented, so that only rotation is possible. The forward-backward feed screw rod 58 is connected to the forward-backward electric drive motor 56 by way of a worm reducer, and is rotated and driven by the forward-backward electric drive motor 56. In this example, a forward-backward feed screw apparatus 54 that has the forward-backward electric drive motor 56 as a drive source is used, however, instead of this, it is also possible to use a linear motor that has a brake function, such as a linear motion ultrasonic motor.

The moving piece (forward-backward feed nut) 16a has a base section 60 and a connecting section 61 that is provided above the base section 60. A screw hole 62 that screws onto the forward-backward feed screw rod 58 is formed on the base section 60. The connecting section 61 and the steering column 5b are connected by way of a transmission member 17a so as to be able to transmit force in the forward-backward direction therebetween. The transmission member 17a is formed by performing cold forging on raw material made of an iron-based alloy such as carbon steel or stainless steel, and a male screw section 63 is provided on the base-end section (top-end section), an outward-facing flange section 64 is provided on the middle section, and a circular column section 65 is provided on the tip-end section (bottom-end section). A fastening hole 66 such as a hexagonal hole is formed in the tip-end surface (bottom-end surface) of the circular column section 65 so that the tip-end section of a tool such as a hexagonal wrench can be fastened. In the transmission member 17a of this example, there is no neck section where the outer diameter becomes particularly small.

As illustrated in FIG. 5 and FIG. 14, the transmission member 17a is fastened with screws to the bottom surface of the middle cylindrical section 40 of the steering column 5b so that tilting in the forward-backward direction is sufficiently suppressed. More specifically, with a cylindrical section of a nut plate 68 inserted into a though hole 67 that is formed on the bottom surface of the middle cylindrical section 40 of the steering column 5b, the nut plate 68 is fastened to the circumferential edge section of the through hole 67 by crimping so as to be mounted to the steering column 5b from the inner circumferential surface side thereof. A radially inward side spacer 69 having an outer diameter that is smaller than the outer diameter of the flange section 64 is placed on the top surface of the flange section 64, and an radially outward side spacer 70 is mounted around this radially inward side spacer 69. The radially inward side spacer 69 is made of a hard material such as an iron-based alloy. However, the radially outward side spacer 70 is made of a high polymer material such as synthetic resin, hard rubber, hard vinyl or the like, or a material having a specified hardness but also having large internal loss and a vibration absorbing capability such as a soft metal. With the bottom surface near the radially inside of the radially outward side spacer 70 in contact with the top surface of the portion near the radially outside of the flange section 64, the top surface of the radially inward side spacer 69 and the top surface of the radially outward side spacer 70 are located on the same plane. Furthermore, a filler piece 71 is held between the top surfaces of the radially inward side spacer 69 and the radially outward side spacer 70 and the bottom surface (outer circumferential surface of the bottom-end section) of the steering column 5b. The filler piece 71 is made of a hard material such as an iron-based alloy and is formed into a circular ring shape or frame shape as a whole with a wedge shaped cross sectional shape. By screwing the male screw section 63 that is provided on the top-end section of the transmission member 17a into the nut plate 68 and further tightening, the transmission member 17a is firmly supported by and fastened to the bottom surface of the middle section of the steering column 5b. The transmission member 17a is supported by and fastened to the middle cylindrical section 40 of the steering column 5b having a relatively large outer diameter, so the transmission member 17a does not hinder the rotation of the steering shaft 2b. Moreover, by combining the radially outward side spacer 70 with the radially inward side spacer 69 made of a hard material, the radially outward side spacer 70 will not be exhausted. Furthermore, even in the case where the radially outward side spacer 70 drops down from the flange section 64 and comes in contact with the moving piece 16a, the occurrence of noise is suppressed since the material of the radially outward side spacer 70 is not hard.

The transmission member 17a that is supported by and fastened to the bottom surface of the middle cylindrical section 40 of the steering column 5b and the moving piece 16a that is screwed onto the forward-backward feed screw rod 58 are combined so as to be able to transmit movement in the forward-backward direction, and so as to be able to be displaced relative to each other in the axial direction of the transmission member 17a. More specifically, an engaging concave section 19a that opens upward is provided in the center section of the connecting section 61 of the moving piece 16a, and the circular column section 65 of the transmission member 17a is inserted into this engaging concave section 19a. A cylindrical shaped spacer 72 is placed between the inner circumferential surface of the engaging concave section 19a and the outer circumferential surface of the circular column section 65 so that there is no looseness, and so that sliding movement in the axial direction of the circular column section 65 is possible. The inner circumferential surface and the outer circumferential surface of the cylindrical spacer 72, except for chamfer sections on both ends in the axial direction, are cylindrical surfaces having no change in the diameter in the axial direction.

In a state that the transmission member 17a and the moving piece 16a are combined, the moving piece 16a does not rotate with respect to the forward-backward feed screw rod 58. When the forward-backward feed screw rod 58 is rotated by the forward-backward electric drive motor 56, the moving piece 16a moves along the forward-backward feed screw rod 58 in a direction that corresponds to the direction of rotation. The direction of movement of the moving piece 16a is basically in the direction of the center axis of the column holder 31, and is parallel to the direction of movement of the steering column 5b. However, due to manufacturing error or assembly error of a product, the direction of the movement of the moving piece 16a and the direction of movement of the steering column 5b may be a little nonparallel. For example, in case that the direction of the abutting section (contact surfaces) between the bottom surface of the column holder 31 and the top surface of the actuator case 53 does not match the direction of movement of the moving piece 16a or the direction of movement of the steering column 5b, these directions of movement may be a little nonparallel. In that case, the transmission member 17a is displaced in the axial direction of the transmission member 17 relative to the moving piece 16a. This relative displacement is performed while there is slippage at the area of contact between the inner circumferential surface of the cylindrical spacer 72 and the outer circumferential surface of the circular column section 65, and at the area of contact between the outer circumferential surface of the cylindrical spacer 72 and the inner circumferential surface of the engaging concave section 19a. These circumferential surfaces are simple cylindrical surfaces, so the surfaces can be processed with high precision without a large increase in cost, and because the sliding sections of these members are located at two locations, the relative displacement between these members can be performed smoothly. In order that the transmission member 17a can be displaced in the forward-backward direction, a long hole 89 in the forward-backward direction that extends in the axial direction of the column holder 31 is provided in part of the column holder 31.

Figure 8:
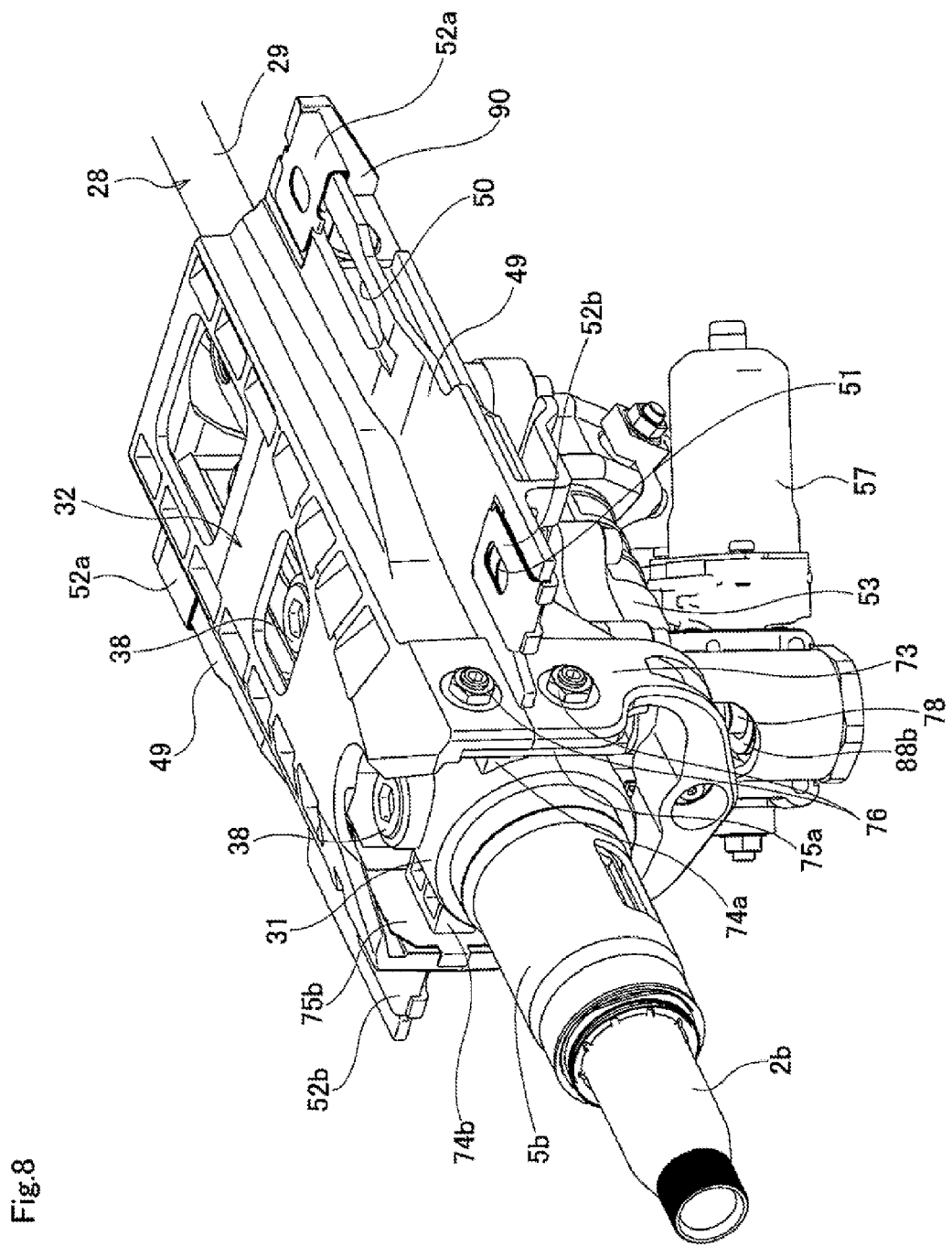
FIG. 8 is a perspective view that illustrates the first example as seen from above on the opposite side from FIG. 7.
Figure 10:
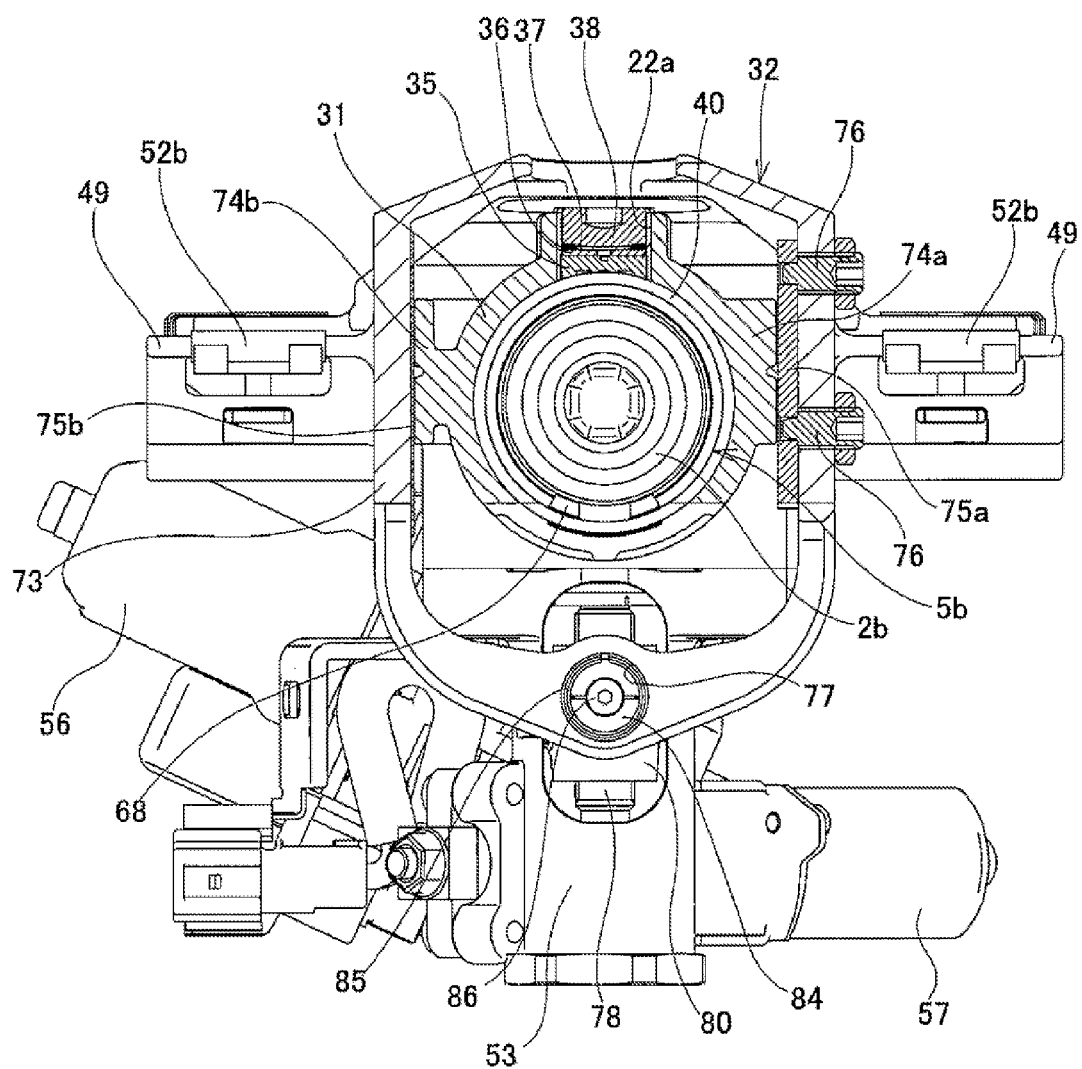
FIG. 10 is a partial cross-sectional drawing that illustrates the first example as seen from the right in FIG. 1 and FIG. 2.

In this example, an up-down feed screw apparatus 55 and up-down electric drive motor 57 are provided as an electric actuator for up-down position adjustment. With the up-down electric drive motor 57 as a drive source, the up-down feed screw apparatus 55 causes the rear section of the steering column 5b to be displaced (raise or lower) in the up-down direction. In this example, the up-down feed screw apparatus 55 causes the entire column holder 31 to be pivotally displaced with respect to the vehicle body-side bracket, with the pair of tilt shafts 33 as the center of rotation. More specifically, as illustrated in FIG. 8 to FIG. 10, a U-shaped support frame 73 is provided at the rear-end section of the vehicle body-side bracket 32, and the rear-end section of the column holder 31 is held inside this support frame 73 so as to be able to raise or lower without looseness. The support frame 73 has inside surfaces that are parallel with each other. On the other hand, convex sections 74a, 74b that have outside surfaces that are parallel with each other are provided on both the right and left sides of the rear-end section of the column holder 31 so as to protrude out in the width direction. The outside surfaces of the convex sections 74a, 74b and the inside surfaces of the support frame 73 engage by way of respective sliding plates 75a, 75b. One sliding plate 75a is thicker than the other sliding plate 75b, and by pressing this thick sliding plate 75a toward the other sliding plate 75b using a pressure screw 76, looseness between the support frame 73 and the column holder 31 is eliminated. The pressure screw 76, after being tightened to a specified torque, is prevented from coming loose by a lock nut. In this example, an up-down feed screw apparatus 55 having the up-down electric drive motor 57 as a drive source is used, however, instead of this, it is also possible to use a linear motor having a brake function such as a linear motion ultrasonic motor.

Figure 15:
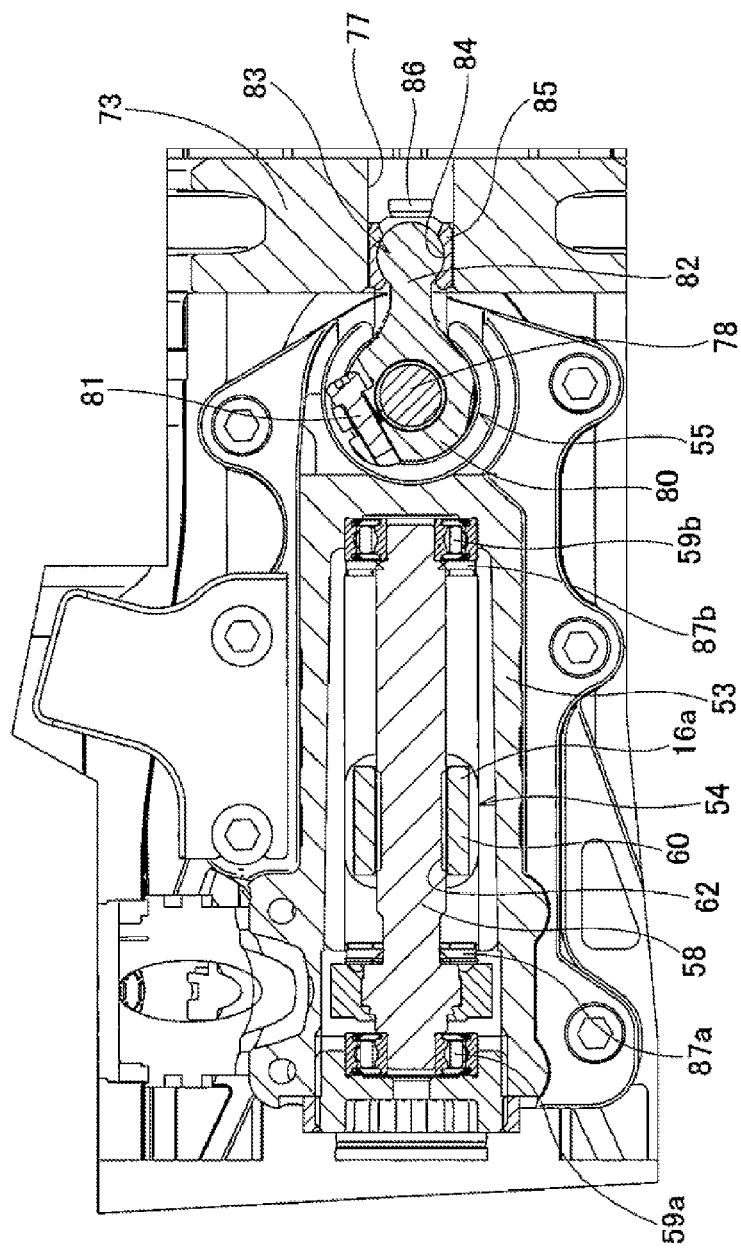
FIG. 15 is an enlarged cross-sectional drawing of section E-E in FIG. 2.
Figure 17:
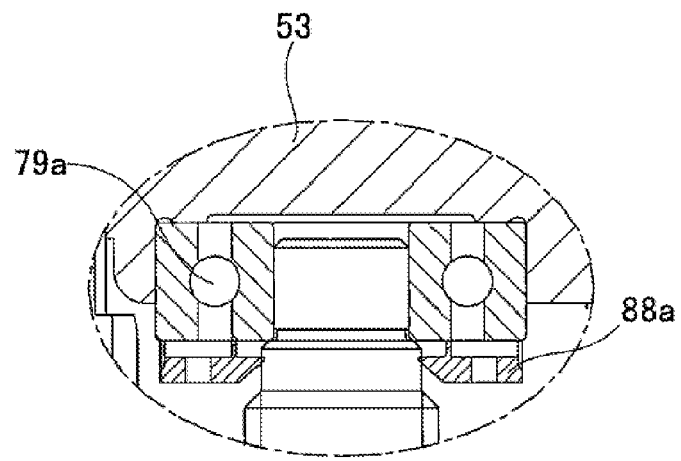
FIG. 17 is a partial enlarged cross-sectional drawing of the support section of both the top and bottom ends of a screw rod for up-down position adjustment as seen from the same direction as in FIG. 1 and FIG. 2.
Figure 17:
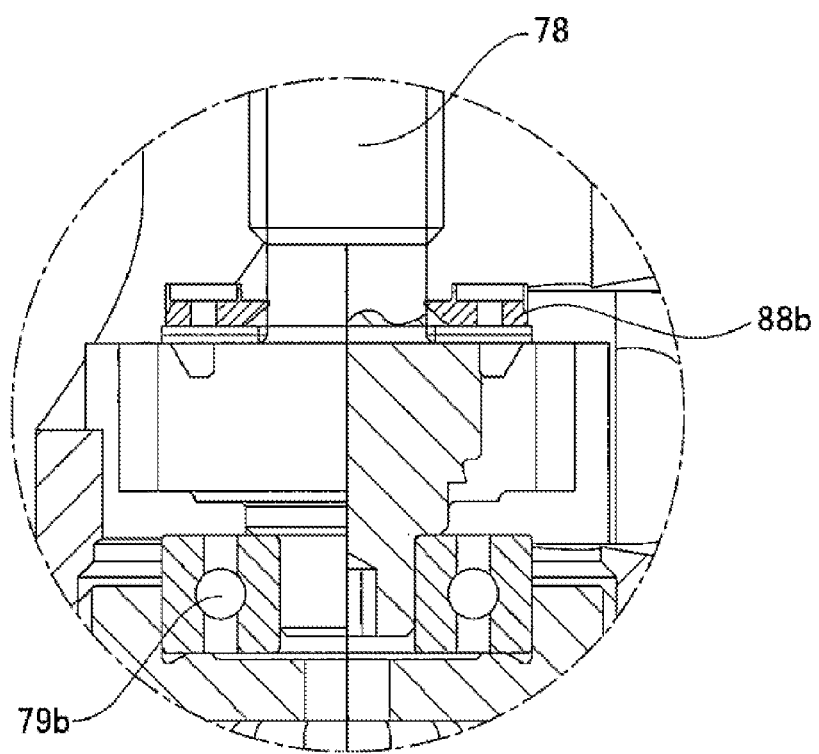

As illustrated in FIG. 5 and FIG. 15, by combining the engaging hole 77 that is provided in the center section in the width direction of the support frame 71 and the up-down feed screw apparatus 55, the rear-end section of the column holder 31 is able to move up or down (raise or lower) according to the power flowing to the up-down electric drive motor 57. As illustrated in FIG. 5 and FIG. 17, both the top and bottom end section of the up-down feed screw rod 78 of the up-down feed screw apparatus 55 is supported by the actuator case 53 by way of a pair of ball bearings 79a, 79b such that only rotation is possible. The up-down feed screw rod 78 is connected to the up-down electric feed drive motor 57 by way of a worm reducer, and is rotated and driven by the up-down electric drive motor 57.

An up-down feed nut 80 screws around the middle section of the up-down feed screw rod 78. The up-down feed nut 80 is formed into a incomplete circular ring shape using a metal material such as an iron-based metal having elasticity, and by adjusting the interference of the screw engagement section with the up-down feed screw rod 78 with a screw 81, it is possible to eliminate any looseness in the screw engagement section. Moreover, the tip-end section of an engaging arm 82 that is integrally provided on the up-down feed nut 80 and the engaging hole 77 can be joined by way of a spherical joint 83 so as to be able to transmit force in the up-down direction and so as to be able to be pivotally displaced. The spherical joint 83 is formed on the tip-end section of the engaging arm 82, and has a spherical engaging section 84 having an outer circumferential surface that is a partial spherical convex surface, and a spacer 85 that is formed into a cylindrical shape using a material such as synthetic resin that slides easily, and has an inner circumferential surface that is a partial spherical concave surface. A screw hole is formed in the center section of the spherical engaging section 84, and a slit in the radial direction is provided thereon, so that the outer diameter of the spherical engaging section 84 can elastically expand or contract. More specifically, by engaging a partial conical shaped convex surface that is formed on the head of an adjustment screw 86 that is screwed into the screw hole in the spherical engaging section 84 with a partial conical shaped concave surface that is formed in the opening section of the screw hole in the spherical engaging section 84, it is possible to adjust the outer diameter of the spherical engaging section 84. By screwing the adjustment screw 86 a proper amount into the screw hole in the spherical engaging section 84, the occurrence of a gap in the spherical joint 83 is prevented. With this kind of construction, movement in the up-down direction is transmitted from the up-down feed nut 80 to the bottom-end section of the support frame 73 without looseness.

Figure 7:
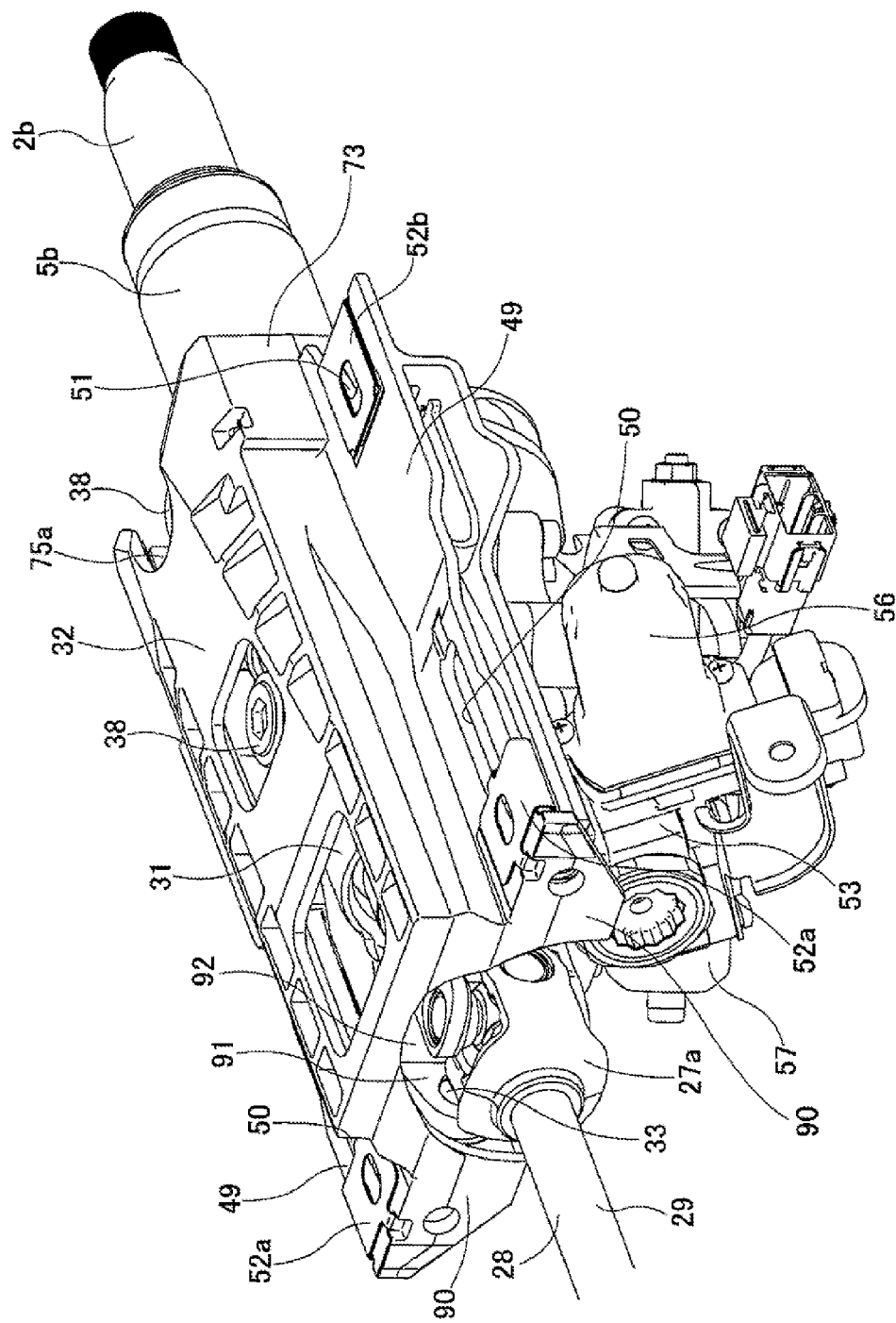
FIG. 7 is an enlarged view of the right half in FIG. 6.

As illustrated in FIG. 7 and FIG. 9 reinforcement ribs 90 are provided on both the left and right sides of the front-end section of the vehicle body-side bracket 32, and these reinforcement ribs 90 maintain the strength and rigidity of the portion of the vehicle body-side bracket where the tilt shaft 33 is located. Moreover, reinforcement ribs 92 are also provided between a pair of left and right pivot support arms 91 that are provided on the front-end section of the column holder 31 in order to pivotally support the column holder 31 by the tilt shaft 33 and the main portion of the column holder 31, and these reinforcement ribs 92 maintain the strength and rigidity of the pivot support arms 91. Therefore, in this example, the strength and rigidity of the pivot support section that supports the column holder 31 with respect to the vehicle body-side bracket 32 are sufficiently maintained, and the operational feeling of the steering wheel 1 is sufficiently prevented from becoming deteriorated due to insufficient rigidity of this pivot support section.

In the following, the position adjustment of the steering wheel 1 by the electric steering wheel position adjustment apparatus of this example will be explained. First, when adjusting the forward-backward position of the steering wheel 1, current is allowed to flow to the forward-backward electric drive motor 56, and the forward-backward electric drive motor 56 rotates the forward-backward feed screw rod 58 by a specified amount in a specified direction. With rotation of the forward-backward feed screw rod 58, the moving piece 16a moves in the forward-backward direction along the forward-backward feed screw rod 58, and the steering column 5b, by way of the transmission member 17a, is moved in the forward-backward direction inside the column holder 31. As a result, the forward-backward position of the steering wheel 1 is adjusted. When the steering wheel 1 is moved to an adjustable limit position, the moving piece 16a comes in contact with one of a pair of stoppers 87a, 87b as illustrated in FIG. 16 that are provided at portions near both ends of the forward-backward feed screw rod 58, and the moving piece 16a is prevented from moving any further. In this state, current flowing to the forward-backward electric drive motor 56 is stopped.

When the forward-backward position of the steering wheel 1 is adjusted to a limit position, the portion on the end section in the axial direction of the steering column 5b where the outer ring 43a, 43b of the ball bearing 42a, 42b is fastened inside with an interference fit comes close to the inner circumferential surface of the end section of the column holder 31. There is a possibility that the end sections in the axial direction of the steering column 5b may deform a little due to the outer rings 43a, 43b being fastened inside, or due to the effect of chucking during processing. However, the end sections in the axial direction of the steering column 5b are the reduced-diameter sections 39a, 39b, and there is no rubbing between the end sections in the axial direction of the steering column 5b and the inner circumferential surface of the end sections of the column holder 31. Therefore, even when the forward-backward position of the steering wheel 1 is adjusted to a limit position, unpleasant noise or vibration does not occur due to rubbing between the end section in the axial direction of the steering column 5b and the inner circumferential surface of the end section of the column holder 31.

Next, when adjusting the up-down position of the steering wheel 1, current is allowed to flow to the up-down electric drive motor 57, and the up-down electric drive motor 57 rotates the up-down feed screw rod 78 by a specified amount in a specified direction. As a result, the up-down feed nut 80 moves in the up-down direction along the up-down feed screw rod 78. However, this up-down feed nut 80 does not move in the up-down direction due to engagement between the engaging hole 77 and the spherical engaging section 84, so the up-down feed screw rod 78 is displaced in the up-down direction, and due to that displacement, the actuator case 53 and column holder 31 that support the up-down feed screw rod 78 is pivotally displaced around the tilt shaft 33. As a result, the up-down position of the steering wheel 1 is adjusted to a specified position. In this case as well, when the steering wheel 1 is moved to a limit position within the adjustable range, the up-down feed nut 80 comes in contact with one of a pair of stoppers 88a, 88b such as illustrated in FIG. 17 that are provided in portions near both ends of the up-down feed screw rod 78, and is prevented from further movement. In this state, electric current flowing to the up-down electric drive motor 57 is stopped.

In the electric steering wheel position adjustment apparatus of this example, the steering shaft 2b and steering column 5b are integrated such that when both are in at least the normal state, the full length is not expanded or contracted, so the rigidity of the steering shaft 2b and steering column 5b is sufficiently maintained. Therefore, it is possible to suppress vibration of the steering wheel 1 and improve the steering performance. Moreover, in this way, the steering shaft 29 having single construction is located inside the non-divided steering column 5b, so an area of fit that is a cause of looseness does not exist in the portion that constitutes the steering column apparatus. Consequently, the occurrence of looseness in the portion that constitutes the steering column apparatus is suppressed, so it is possible to increase the resonant frequency of that portion. As a result, it becomes possible to avoid resonance with traveling vibration that has a low resonant frequency, or engine vibration having large amplitude.

Moreover, the pair of sliding plates 35 that are supported in series at two locations at the front and rear of the column holder 31 and that support the steering column 5b so as to be able to be displaced in the axial direction elastically push the middle cylindrical section 40 of the steering column 5b toward the inner circumferential surface of the column holder 31, so looseness between the steering column 5b and the column holder 31 is eliminated. Particularly, by bringing the outer circumferential surface of the middle cylindrical section 40 having a relatively large diameter in contact with the sliding plates 35, the area of the contact surface between these members becomes large, so it becomes possible to make the force by which the sliding plates 35 push the steering column 5b relatively small. Moreover, the gap in the axial direction in the portion where the sliding plates 35 push the outer circumferential surface of the steering column 5b can be kept as large as possible within the range of movement in the forward-backward direction of the steering column 5b, so the rigidity in the area of fit between the steering column 5b and the column holder 31 is sufficiently maintained. Furthermore, by using the moment that occurs between the sliding plates 35 and the sliding section on the outer circumferential surface of the steering column 5b, it is possible to make the force by which the sliding plates 35 pushes the steering column 5b relatively small. With this kind of construction, it is possible to reduce the load that is applied when moving the steering wheel 1 in the forward-backward direction, so it is possible to lessen the operating noise of the forward-backward electric drive motor 56. Moreover, even when the tolerance for the inner-diameter dimension of the column holder 31 and the tolerance for the outer-diameter dimension of the steering column 5b are the same as in the conventional construction, it is possible to eliminate looseness, so tilting of the steering column 5b and the transmission member 17a can be kept small. Therefore, there is no need to use a spherical shape having a high degree of displacement absorbency for the tip-end section of the transmission member 17a, and it is possible to use a simple shape such as a circular column shape.

In the apparatus of this example, construction does not allow expansion and contraction of the overall length of the steering shaft 2b and steering column 5b, so when adjusting the forward-backward position of the steering wheel 1, the center position of the universal joint 27a, and the joint cross 34, which is the center of displacement of the universal joint 27a, is displaced in the axial direction of the steering shaft 2b and steering column 5b. On the other hand, when adjusting the forward-backward position of the steering wheel 1, the installation position of the tilt shaft 33 that is provided between the front-end section of the column holder 31 and the front-end section of the vehicle body-side bracket 32 does not change even though the forward-backward position of the steering wheel 1 is adjusted.

Therefore, depending on the forward-backward position of the steering wheel 1, a state occurs in which the center position of the joint cross 34 is not located on the center axis of the tilt shaft 33. In this state, when pivotally displacing the column holder 31 centered around the tilt shaft 33 in order to adjust the up-down position of the steering wheel 1, the center position of the joint cross 34 is pivotally displaced centered around the tilt shaft 33. As the center of this joint cross 34 is pivotally displaced, the distance between the universal joint 27a on the rear side that includes this joint cross 34 and the universal joint on the front side changes. The change in this distance is absorbed by the expansion or contraction of the intermediate shaft 28. However, in order to expand or contract the intermediate shaft 28, it is necessary to overcome the friction resistance that acts in the area of fit between the intermediate inner shaft 29 and the intermediate outer shaft 30. Due to this kind of friction resistance, the resistance against the pivotal displacement of the column holder 31 becomes large, and there is a possibility that the capability for smooth adjustment of the up-down position of the steering wheel 1 will be lost. The amount that this capability for smooth adjustment is lost becomes more extreme as the amount that the intermediate shaft expands or contracts during adjustment of the up-down position becomes larger, and the resistance that accompanies the expansion or contraction of the intermediate shaft 28 becomes larger.

In the construction of this example, the center axis $O_C$ of the tilt shaft 33 is located in the center position in the forward-backward direction between the center position $O_F$ of displacement of the front-end side and the center position $O_B$ of displacement of the rear-end side. Therefore, even in a state in which the center position of the joint cross 34 is not located on the center axis $O_C$ of the tilt shaft 33, it is possible to keep the radius of the pivotal displacement of the center position of the joint cross 34, accompanying the pivotal displacement of the column holder 31 centered around the tilt shaft 33, which is the amount that the center position of the joint cross 34 is shifted from the center axis $O_C$, small. By keeping this radius small, it is possible to keep the amount of expansion or contraction of the intermediate shaft 28 due to adjustment of the up-down position small, and it is possible to keep the resistance due to the expansion or contraction of the intermediate shaft 28 small. As a result, it is possible to smoothly adjust the up-down position of the steering wheel 1 regardless of the forward-backward position of the steering wheel 1.

Figure 18:
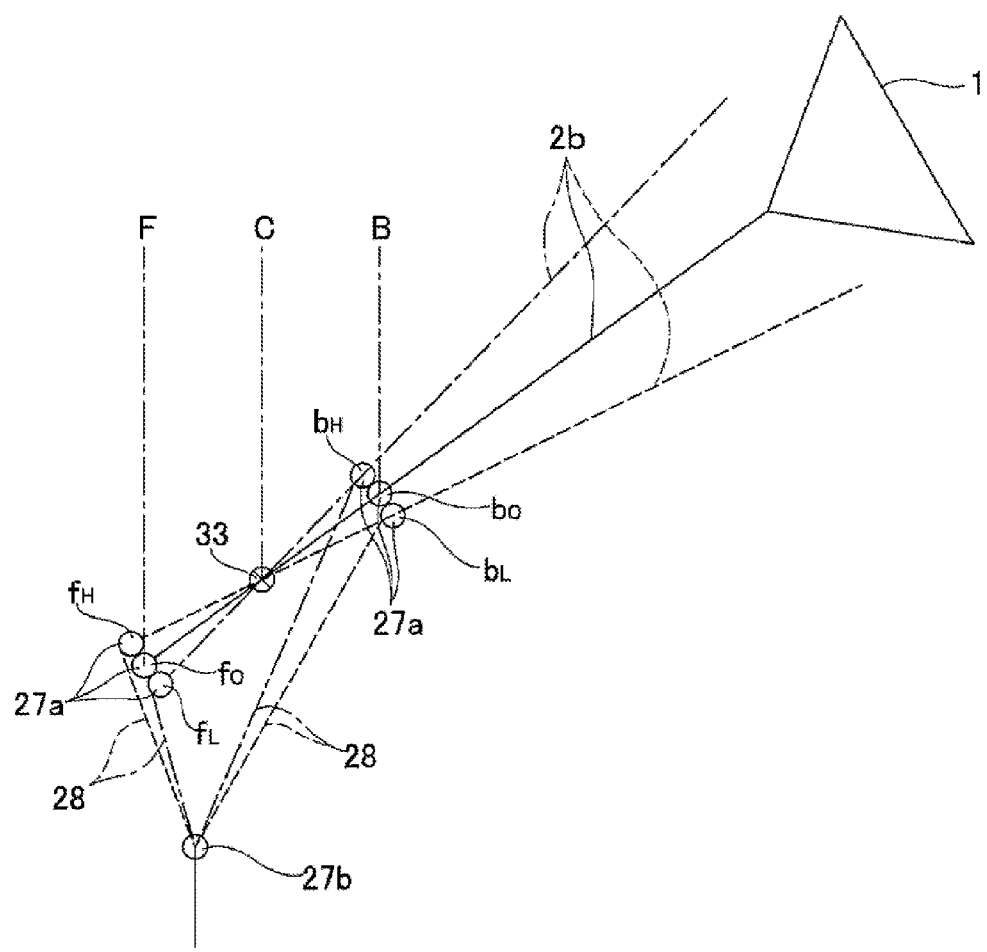
FIG. 18 is a schematic drawing for explaining the change of the amount of expansion and contraction of the intermediate shaft when adjusting the up-down position of the steering wheel according to the forward-backward position of the steering wheel.

In FIG. 18, the positions represented by F, C and B indicate the position of the center of displacement of the universal joint 27a when the steering wheel 1 is moved to the front-end position, and the center position and rear-end position of the adjustable range when the up-down position of the steering wheel 1 is in the neutral state. When the forward-backward position of the steering wheel 1 is in the center position, and the position of the center of displacement of the universal joint 27a is located on the center axis of the tilt shaft 33, the universal joint 27a does not raise or lower even when the intermediate shaft 28 expands or contracts as the up-down position of the steering wheel 1 is adjusted. Therefore, the intermediate shaft 28 and universal joint 27a do not resist the adjustment of the up-down position of the steering wheel 1.

On the other hand, when adjusting the up-down position in a state in which the steering wheel 1 has been moved to the front-end position represented by F the position of the center of displacement of the universal joint 27a is displaced between $f_H$ and $f_L$ with $f_O$ as the center, and the intermediate shaft 28 expands or contracts due to this displacement. As can be seen from FIG. 18, the amount of expansion or contraction between $f_H$ and $f_L$ is relatively large. This amount of expansion or contraction increases the longer the distance that the position of the center of displacement of the universal joint 27a is separated from the tilt shaft 33 becomes. In the construction of this example, by locating the position of the center axis $O_C$ of the tilt shaft 33 at the center position in the forward-backward direction between the position of the center of displacement $O_F$ of the front-end side and the position of the center of displacement. Os of the rear-end side, it is possible to suppress the maximum value of the distance that the position of the center of displacement of the universal joint 27a is separated from the tilt shaft 33 more than in the case of construction in which the center axis $O_C$ is located further toward the rear than the position of the center of displacement $O_B$ of the rear-end side. Therefore, even when adjusting the up-down position when the steering wheel 1 is moved to the very front position, it is possible to keep this amount of expansion or contraction small and it is possible to perform the up-down position adjustment smoothly.

On the other hand, in a state in which the steering wheel 1 has been moved to the rear-end position represented by B, the universal joint 27a that connects the front-end section of the steering shaft 2b and the rear-end section of the intermediate shaft 28 is located further toward the rear than the tilt shaft 33. When up-down position adjustment is performed in this state, the position of the center of displacement of the universal joint 27a is displaced between $b_H$ and $b_L$ with $b_O$ as the center; and the intermediate shaft 18 expands or contracts due to this displacement. As can be seen from FIG. 18, the amount of this expansion or contraction is kept relatively small. Instead of that, during up-down position adjustment of the steering wheel 1, the portion that includes the universal joint 27a becomes the load on the up-down electric drive motor 57 of the electric actuator for up-down position adjustment. This is because, unlike in the case when the universal joint 27a is located further toward the front than the tilt shaft 33, the weight of the portion of the universal joint 27a is not cancelled out by other portions. Therefore, the load on the up-down electric drive motor 57 during up-down position adjustment of the steering wheel 1 becomes large, so a larger motor must be used, which is disadvantageous from the aspect of making the electric steering wheel position adjustment apparatus more compact and lightweight. This tendency becomes even more extreme the larger the distance that the universal joint 27a is separated from the tilt shaft 33 becomes. However, in this example, the positional relationship of the center axis $O_C$ of the tilt shaft 33, and the positions of the center of displacement OF, $O_B$ are regulated as described above, so when compared with construction in which the center axis $O_C$ is located further toward the front than the position of the center of displacement $O_F$ on the front side, it is possible to suppress the maximum value of the distance that the position of the center of displacement of the universal joint 27a is separated from the tilt shaft 33. Therefore, it is possible to keep the amount that the load on the up-down electric drive motor 57 becomes increases low, and thus it is easier to make the apparatus more compact and lightweight.

Locating the center axis $O_C$ of the tilt shaft 33 at the center position in the forward-backward direction is also advantageous from the aspect of suppressing fluctuation in the torque required for operating the steering wheel 1, regardless of the adjustment of the forward-backward position of the steering wheel 1. In other words, when the universal joints 27a, 27b, which are both joint cross universal joint, transmit torque in a state in which a joint angle is applied, the torque characteristic (torque loss) changes in accordance with the phase variation in the rotational direction. When this kind of change in the torque characteristic is left as is, the driver that is operating the steering wheel 1 will experience an unpleasant feeling. Therefore, by making the phase in the rotational direction of the universal joints 27a, 27b suitably different, the fluctuations in torque characteristic of these universal joints 27a, 27b will cancel each other out. In this case, it is necessary to make suitable the relationship between the joint angles of the universal joints 27a, 27b and the shift in the phase in the rotational direction, however, in the construction of this example, the position of the universal joint 27a on the rear side shifts as the forward-backward position of the steering wheel 1 is adjusted. As a result, the relationship of the joint angles of the universal joints 27a, 27b shifts from the initial relationship. When this shift is large, it is not possible to sufficiently suppress the fluctuation in the torque characteristic of these universal joints 27a, 27b, and there is a possibility that the driver that is operating the steering wheel 1 will experience an unpleasant feeling. On the other hand, in the construction of this example, it is possible to keep the amount of this shifting small, so it is possible to keep the possibility that driver that is operating the steering wheel 1 will experience an unpleasant feeling low.

Moreover, the sliding plates 35 push the steering column 5b downward toward the forward-backward feed screw apparatus 54, so a moment in the horizontal direction does not occur according to this pushing, and looseness of the steering column 5b inside the column holder 31 that may occur when the forward-backward feed screw apparatus 54 is operated and stopped is suppressed, and up-down movement of the steering column 5b that may occur when inverting the displacement operation is also suppressed. Even in the case where it is necessary to perform a finishing process on the outer circumferential surface of the middle cylindrical section 40 in order to improve the precision of the area of fit between the outer circumferential surface of the steering column 5b and the inner circumferential surface of the column holder 31, the outer circumferential surface of the middle cylindrical section 40 has the largest diameter of the outer circumferential surface of the steering column 5b, so performing a finishing process on the outer circumferential surface of this middle cylindrical section 40 does not effect the other portions, and can be performed easily and efficiently. Moreover, the support rigidity of the steering wheel 1 as well can be easily adjusted by changing the thickness of the metal plate of the steering column 5b and steering shaft. 2b. Furthermore, the portions of the steering column 5b that are pushed by the sliding plates 35 are located in the portion of the steering column 5b having the larger diameter, so the surface area of the pushed portions can be made large, and thus it is not necessary to make the force by which the sliding plates 35 push the steering column 5b excessively large. The effect of suppressing looseness is obtained by a small pushing force such as this, so the load during operation is stable and small and thus it is also possible to reduce the operating noise of the forward-backward electric drive motor 56.

In the construction of this example, the shape of the transmission member 17a and the cylindrical spacer 72 for transmitting the movement of the moving piece 16a of the forward-backward feed screw apparatus 54 to the steering column 5b is simple, so it is possible to use cold forging to manufacture the transmission member 17a and cylindrical spacer 72 at low cost and with high precision.

Moreover, the relative displacement in the axial direction of the transmission member 17a between the transmission member 17a and the moving piece 16a is compensated for at two locations; the inner circumferential surface and outer circumferential surface of the cylindrical spacer 72, and the outer circumferential surface of the tip-end section of the transmission member 17a and the inner circumferential surface of the engaging concave section 19a that is provided on the moving piece 16a. Therefore, even when the direction of movement of the moving piece 16a and the direction of movement of the steering column 5b accompanying adjustment of the forward-backward position of the steering wheel 1 become nonparallel due to bad precision of the engaging bottom surface of the column holder 31 and the top surface of the actuator case 53, and there is relative displacement in the axial direction of the transmission member 17a between the transmission member 17a and the moving piece 16a accompanying the forward-backward position adjustment of the steering wheel 1, there is rubbing at two locations, so the length of each rubbing location can be made short, and thus it is possible to suppress the occurrence of noise and vibration. Furthermore, there is no neck section in the transmission member 17a, that is disadvantageous from the aspect of maintaining strength and rigidity, so the durability and reliability of the forward-backward feed screw apparatus 54 is maintained.

Furthermore, with construction of this example, the up-down feed screw rod 78 of the up-down feed screw apparatus 55 is located directly below the column holder 31 in the radial direction of the column holder 31, so no adverse moment is applied to the column holder 31 during up-down position adjustment of the steering wheel 1. Therefore, it is possible to perform this up-down position adjustment smoothly. Locating the support frame 73 for guidance during up-down position adjustment as far toward the rear as possible within a range that does not interfere with the portion fastened to the steering column 5b is preferred from the aspect of maintaining support rigidity of the column holder 31 as well as maintaining the support rigidity of the steering wheel 1 regardless of the forward-backward movement of the steering column 5b during forward-backward position adjustment of the steering wheel 1. Moreover, preferably the sliding plates 75a, 75b are coated with a lubricant such as grease in order that up-down adjustment of the steering wheel 1 is performed smoothly. Furthermore, preferably arranging the up-down feed screw rod 78 and the forward-backward feed screw rod 58 such that the center axes are orthogonal to each other is preferred from the aspect of being able to smoothly perform up-down adjustment and forward-backward adjustment of the steering wheel 1, and being able to keep the installation space of the forward-backward feed screw apparatus 54 and up-down feed screw apparatus 55 small.

Second Example of an Embodiment

Figure 19:
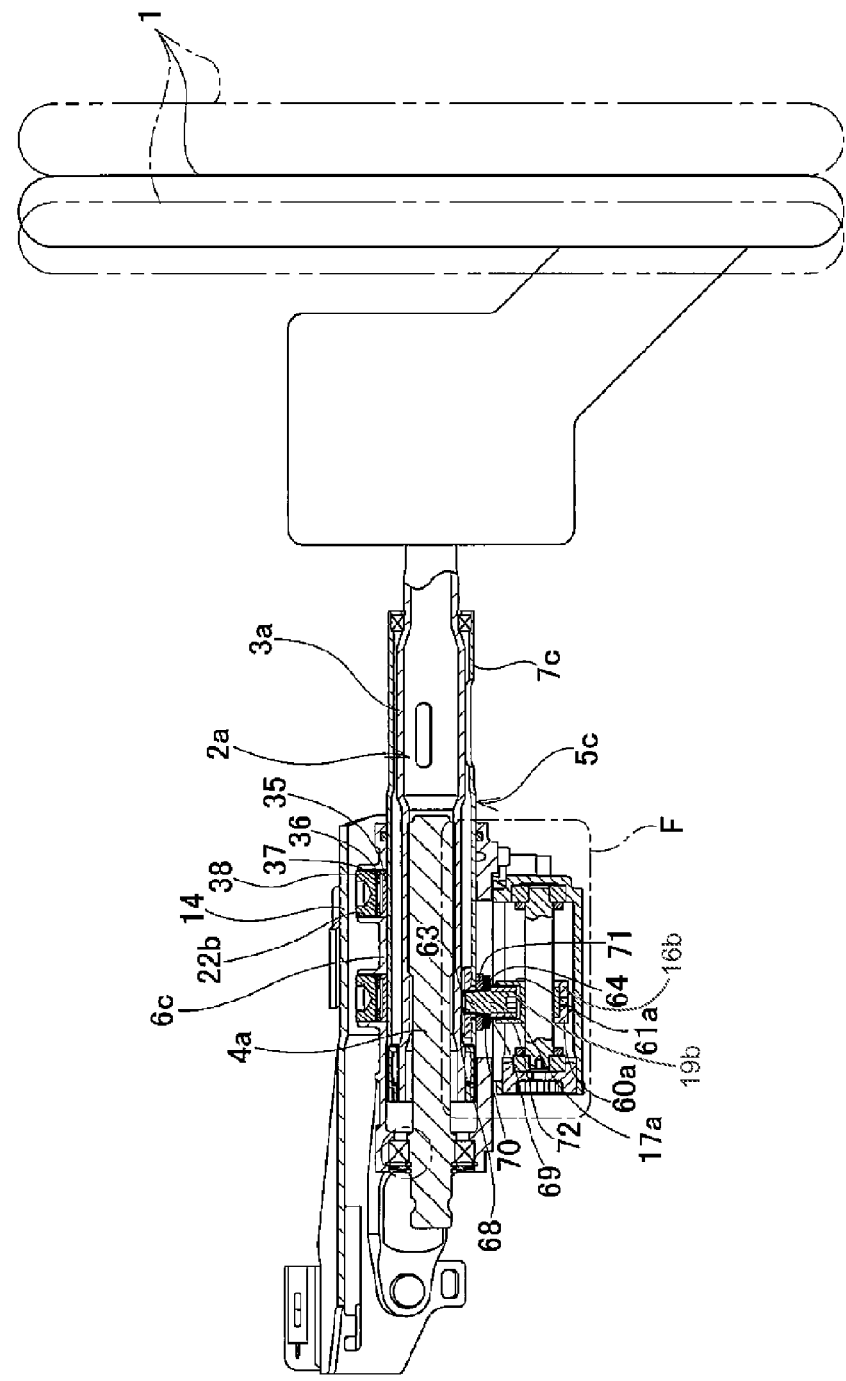
FIG. 19 is a vertical cross-sectional side view illustrating a second example of an embodiment of the present invention.
Figure 20:
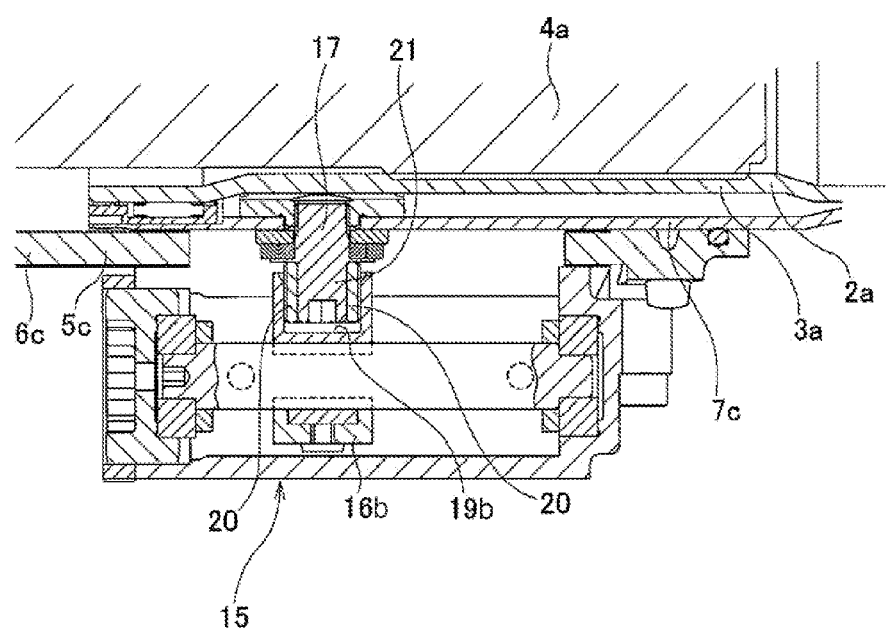
FIG. 20 is an enlarged view of part F in FIG. 19.

FIG. 19 and FIG. 20 illustrate a second example of an embodiment of the present invention. This example illustrates the case in which the construction of the present invention is applied to the second example of conventional technology. In this example, the steering shaft 2a has a cylindrical outer shaft 3a, and a circular rod shaped inner shaft 4a that is inserted inside the outer shaft 3a so as to be able to slide in the axial direction and be able to transmit torque. Moreover, the steering column 5c of the column unit of the present invention has a cylindrical outer column 6c that is supported by an installation bracket 14, and a cylindrical inner column 7c that is inserted inside the outer column 6c so as to be able to slide in the axial direction. The steering shaft 2a is supported on the inside of the steering column 5c so as to be able to rotate freely, and the outer shaft 3a and the inner column 7c move in the forward-backward direction relative to the inner shaft 4a and the outer column 6c. In this example, the outer column 6c corresponds to the support section of the column unit of the present invention, and the inner column 7c corresponds to the adjusted section of the column unit of the present invention.

As illustrated in FIG. 19, in this example, in order to eliminate looseness of the inner column 7c with respect to the outer column 6c, holding holes 22b are formed at two locations in the top surface of the outer column 6c that are separated in the forward-backward direction so as to pass through between the inner circumferential surface and outer circumferential surface of the outer column 6c. Inside each of the holding holes 22b, there is assembled in order from the inside a sliding plate 35, a washer 36, and a disc spring 37, and the opening on the top end of the holding hole 22b is covered by a screw cover 38. In this state, the sliding plates 35 located on the radially inward side ends of the holding holes are pushed against the outer circumferential surface (top surface) of the inner column 7c by the elastic force of the disc springs 37.

In this example, a linear motion ultrasonic motor 15a that is supported by the bottom-end section of the installation bracket 14 causes the inner column 7c to be displaced in the axial direction with respect to the outer column 6c. A moving piece 16b that is provided in the linear motion ultrasonic motor 15a and arranged so as to be able to move in the axial direction (forward-backward) direction of the steering column 5c has a base section that is connected to the linear motion ultrasonic motor 15a and a connecting section 61a that is provided above the base section 6a, and an engaging concave section 19b is provided in the center section of this connecting section 61a.

In this example as well, the transmission member 17a has a male screw section 63 on the top-end section thereof, an outward facing flange section 64 around the middle section, and a circular column section 65 on the bottom-end section. The transmission member 17a is fastened by screws to the inner column 7c in a state such that filler pieces 71 are held between the top surfaces of a radially inward side spacer 69 and a radially outward side spacer 70 that are arranged around the top surface of the flange section 64 and the inner column 7b. The circular column section of the transmission member 17a is placed inside the engaging concave section 19b of the moving piece 16b by way of a cylindrical shaped spacer 72 so as to be able to slide in the axial direction of the transmission member 17a without looseness.

The engaging concave section 19b of the moving piece 16b has an inner circumferential surface that is a cylindrical concave surface having an inner diameter that does not change in the axial direction of the transmission member 17a; the circular column section 65, which is the tip-end section of the transmission member 17a, has an outer circumferential surface that is a cylindrical convex surface having an outer diameter that does not change in the axial direction of the transmission member 17a; and the cylindrical shaped spacer 72 has an outer circumferential surface that is a cylindrical convex surface having an outer diameter that does not change in the axial direction of the transmission member 17a and an inner circumferential surface that is a cylindrical concave surface having an inner diameter that does not change in the axial direction of the transmission member 17a. The other construction and functions of this example are the same as in the first example of an embodiment.

INDUSTRIAL APPLICABILITY

The electric steering wheel position adjustment apparatus of the present invention can be applied to not only to the adjustment of the forward-backward position of a steering wheel as described in the embodiment above, but can also be suitably applied to an electric tilt and telescopic steering apparatus that is able to adjust the up-down position of the steering wheel as well. The invention can also be applied to an electric telescopic steering apparatus that does not have a tilt mechanism and that adjusts only the forward-backward position of the steering wheel. Moreover, the construction for attachment to a vehicle body, and construction for joining the steering shaft and universal joint are not limited, and the present invention can be widely applied to electric steering wheel position adjustment apparatuses that are assembled in electric steering apparatuses in which various kinds of conventionally known construction are employed.

EXPLANATION OF REFERENCE NUMBERS

1 Steering wheel
2, 2a, 2b Steering shaft
3, 3a Outer shaft
4, 4a Inner shaft
5, 5a, 5b, 5c Steering column
6, 6a, 6b, 6c Outer column
7, 7a, 7b, 7c Inner column
8 Gear housing
9 Feed nut
10 Push-pull arm
11 Push-pull rod
12 Male screw section
13 Worm reducer
14 Installation bracket
15, 15a Linear motion ultrasonic motor
16, 16b Moving piece
16a Moving piece (forward-backward feed nut)
17, 17a Transmission member
18 Spherical joint
19, 19a, 19b Engaging concave section
20 Spacer
21 Spherical engaging section
22, 22a, 22b Holding hole
23 Female screw
24 Adjustment screw
25 Disc spring
26 Pad
27a, 27b Universal joint
28 Intermediate shaft
29 Intermediate inner shaft
30 Intermediate outer shaft
31 Column holder
32 Vehicle body-side bracket
33 Tilt shaft
34 Joint cross
35 Sliding plate
36 Washer 37 Disc spring
38 Screw cover
39a, 39b Reduced-diameter section
40 Middle cylindrical section
41a, 41b Inclined surface section
42a, 42b Ball bearing
43a, 43b Outer ring
44a, 44b Inner ring
45 Retaining ring
46 Push nut
47 Elastic material
48 Screw hole
49 Installation plate section
50 Long hole
51 Notch
52a, 52b Sliding plate
53 Actuator case
54 Forward-backward feed screw apparatus
55 Up-down feed screw apparatus
56 Forward-backward electric drive motor
57 Up-down electric drive motor
58 Forward-backward feed screw rod
59a, 59b Ball bearing
60, 60a Base section
61, 61a Connecting section
62 Screw hole
63 Male screw section
64 Flange section
65 Circular column section
66 Fastening hole
67 Through hole
68 Nut plate
69 Radially inward side spacer
70 Radially outward side spacer
71 Filler piece
72 Cylindrical spacer
73 Support frame
74a, 74b Convex section
75a, 75b Sliding plate
76 Pressure screw
77 Engaging hole
78 Up-down feed screw rod
79a, 79b Ball bearing
80 Up-down feed nut
81 Screw
82 Engaging arm
83 Spherical joint
84 Spherical engaging section
86 Spacer
87a, 87b Stopper
88a, 88b Stopper
89 Long hole in the forward-backward direction
90 Reinforcement rib
91 Pivot support arm
92 Reinforcement rib

What is claimed is:

1. An electric steering wheel position adjustment apparatus, comprising:
   a steering shaft having a rear-end section which a steering wheel is supported by and fastened to; and
   a column unit extending in an axial direction of the steering shaft and rotatably supporting the steering shaft on an inside of the column unit, the column unit comprising:
      a support section supported by a portion that is fastened to a vehicle body or to a vehicle body-side bracket that is supported by the portion that is fastened to the vehicle body, the support section not being displaced during position adjustment of the steering wheel; and
      an adjusted section supported by the support section so as to be displaceable in the axial direction of the steering shaft together with at least part of the steering shaft during position adjustment of the steering wheel;
   an electric actuator fastened to a bottom side of the support section, and having an electric motor as a drive source, causing the adjusted section to be displaced in the axial direction of the steering shaft with respect to the support section;
   mechanisms pushing the adjusted section downward, the mechanisms being provided in at least two locations on a top side of the support section that are separated in a forward-backward direction of the column unit, and
   a pair of preloaded angular ball bearings having back-to-back contact angles and being located between both end sections in the forward-backward direction of the adjusted section and at least part of the steering shaft, and
   the pair of ball bearings rotatably supporting the at least part of the steering shaft with respect to the adjusted section in a state that displacement in the axial direction of the steering shaft with respect to the adjusted section is prevented.

2. The electric steering wheel position adjustment apparatus according to claim 1, wherein
   the both end sections in the forward-backward direction of the adjusted section are constructed by reduced-diameter sections having diameters that are smaller than a diameter of a middle section in the forward-backward direction of the adjusted section,
   the middle section in the forward-backward direction of the adjusted section is constructed by a middle cylindrical section having an outer diameter that does not change in the axial direction,
   the pair of ball bearings are located between inner circumferential surfaces of the both end sections in the forward-backward direction of the adjusted section and an outer circumferential surface of the at least part of the steering shaft, and
   the mechanisms pushing the adjusted section downward are provided so as not to separate from the middle cylindrical section regardless of displacement in the axial direction of the adjusted section with respect to the support section.

3. The electric steering wheel position adjustment apparatus according to claim 1, wherein
   each of the mechanisms pushing the adjusted section downward comprises:
   a holding hole formed so as to pass through between an inner circumferential surface and an outer circumferential surface of the support section;
   a sliding plate;
   an elastic member; and
   a cover,
   the sliding plate, the elastic member and the cover being assembled in the holding hole in order from an inside in a radial direction of the support section, and
   the elastic member is elastically compressed between the sliding plate and the cover, such that the sliding plate pushes an outer circumferential surface of the adjusted section.

4. The electric steering wheel position adjustment apparatus according to claim 1, wherein spacing in the axial direction of the mechanisms pushing the adjusted section downward is essentially equal to a maximum range of movement of the adjusted section in the axial direction of the support section.

5. The electric steering wheel position adjustment apparatus according to claim 2, wherein
the electric actuator comprises:
a forward-backward feed screw rod being arranged parallel with the adjusted section, and being rotated and driven by the electric motor;
a moving piece being screwed onto the forward-backward feed screw rod, and moving in the forward-backward direction according to rotation of the forward-backward feed screw rod; and
a transmission member having a tip-end section that is connected to the moving piece and a base-end section that is joined to the middle cylindrical section of the adjusted section, and transmitting movement of the moving piece to the adjusted section.

6. The electric steering wheel position adjustment apparatus according to claim 5, wherein
an engaging concave section is provided in the moving piece,
the tip-end section of the transmission member engages with the engaging concave section of the moving piece by way of a spacer,
the engaging concave section of the moving piece has an inner circumferential surface that is a cylindrical concave surface having an inner diameter that does not change in an axial direction of the transmission member,
the tip-end section of the transmission member has an outer circumferential surface that is a cylindrical convex surface having an outer diameter that does not change in the axial direction of the transmission member, and
the spacer has an outer circumferential surface that is a cylindrical convex surface having an outer diameter that does not change in the axial direction of the transmission member and an inner circumferential surface that is a cylindrical concave surface having an inner diameter that does not change in the axial direction of the transmission member.

7. The electric steering wheel position adjustment apparatus according to claim 1, wherein
the steering shaft has integrated construction of which an overall length thereof does not expand or contract, and
the adjusted section comprises a steering column having integrated construction of which an overall length thereof does not expand or contract, wherein
the electric steering wheel position adjustment apparatus further comprises:
an expandable intermediate shaft transmitting rotation of the steering shaft to an input shaft of a steering gear unit; and
a universal joint connecting a front-end section of the steering shaft and a rear-end section of the intermediate shaft, wherein
the electric actuator causes the steering column to be displaced in the axial direction of the steering column, causing the steering shaft to move in the forward-backward direction, and movement of the steering shaft is compensated by causing the intermediate shaft to expand or contract.

\* \* \* \* \*